United States Patent [19]
Durflinger et al.

[11] Patent Number: 5,713,014
[45] Date of Patent: Jan. 27, 1998

[54] MULTI-MODEL DATABASE MANAGEMENT SYSTEM ENGINE FOR DATABASE HAVING COMPLEX DATA MODELS

[75] Inventors: Kevin Durflinger, Lafayette; Jon D. Reid, West Lafayette; Kim M. Logan, Lafayette, all of Ind.

[73] Assignee: Micro Data Base Systems, Inc., West Lafayette, Ind.

[21] Appl. No.: 565,890

[22] Filed: Dec. 1, 1995

Related U.S. Application Data

[62] Division of Ser. No. 309,909, Sep. 21, 1994, Pat. No. 5,611,076.
[51] Int. Cl.$^6$ .................................................. G06F 17/30
[52] U.S. Cl. ................................. 395/604; 395/613
[58] Field of Search .............................. 395/601, 604, 395/611, 613

[56] References Cited

U.S. PATENT DOCUMENTS

| | | | |
|---|---|---|---|
| 5,517,641 | 5/1996 | Barry et al. | 395/612 |
| 5,596,744 | 1/1997 | Dao et al. | 395/610 |
| 5,600,832 | 2/1997 | Eisenberg et al. | 395/619 |
| 5,649,190 | 7/1997 | Sharif-Askary et al. | 395/612 |

*Primary Examiner*—Thomas G. Black
*Assistant Examiner*—Jack M. Choules
*Attorney, Agent, or Firm*—Woodard,Emhardt,Naughton Moriarty & Mcnett

[57] ABSTRACT

A multi-model database management system (DBMS) presents to its users a variety of logical models, or views of stored data, using industry-standard interfaces, while the physical storage of data is managed in a manner that closely follows the data model. Databases are built from sets of records using the entity-relationship data model. Space is reserved in each owner record for a set pointer pointing to either a member record or a Dynamic Pointer Array (DPA) structure that relates the owner record to member records. The DPA itself contains set pointers to all of the related member records. Each member record, in turn, has a set pointer pointing back to a particular owner record, or, in certain instances, to another DPA. In such cases, the DPA contains set pointers pointing to all of the related owner records. The DBMS supports a variety of logical models including the relational model, and further supports a plurality of industry-standard Application Program Interfaces using SQL query access language.

8 Claims, 27 Drawing Sheets

Layered Architecture

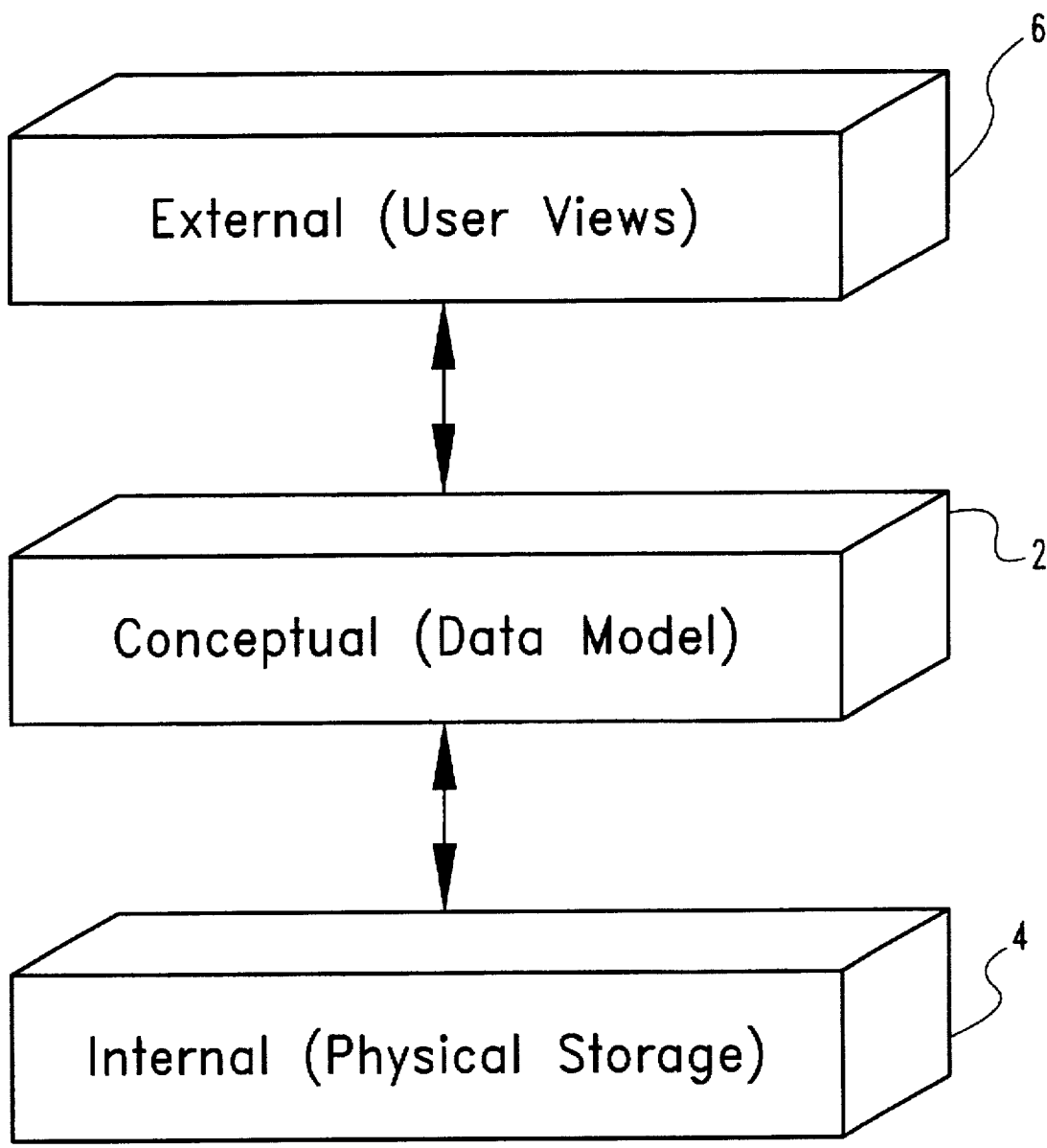
Fig. 1: ANSI SPARC Three – Schema DBMS Architecture

Fig. 2: Entities and Attributes
Entity BOOK has attributes TITLE, AUTHORS, PUBLISHER
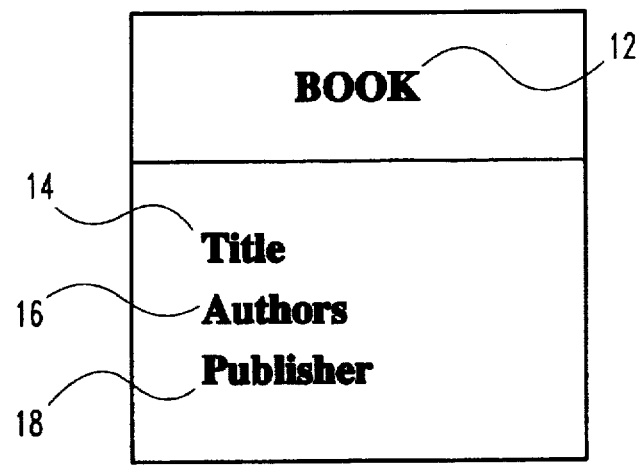

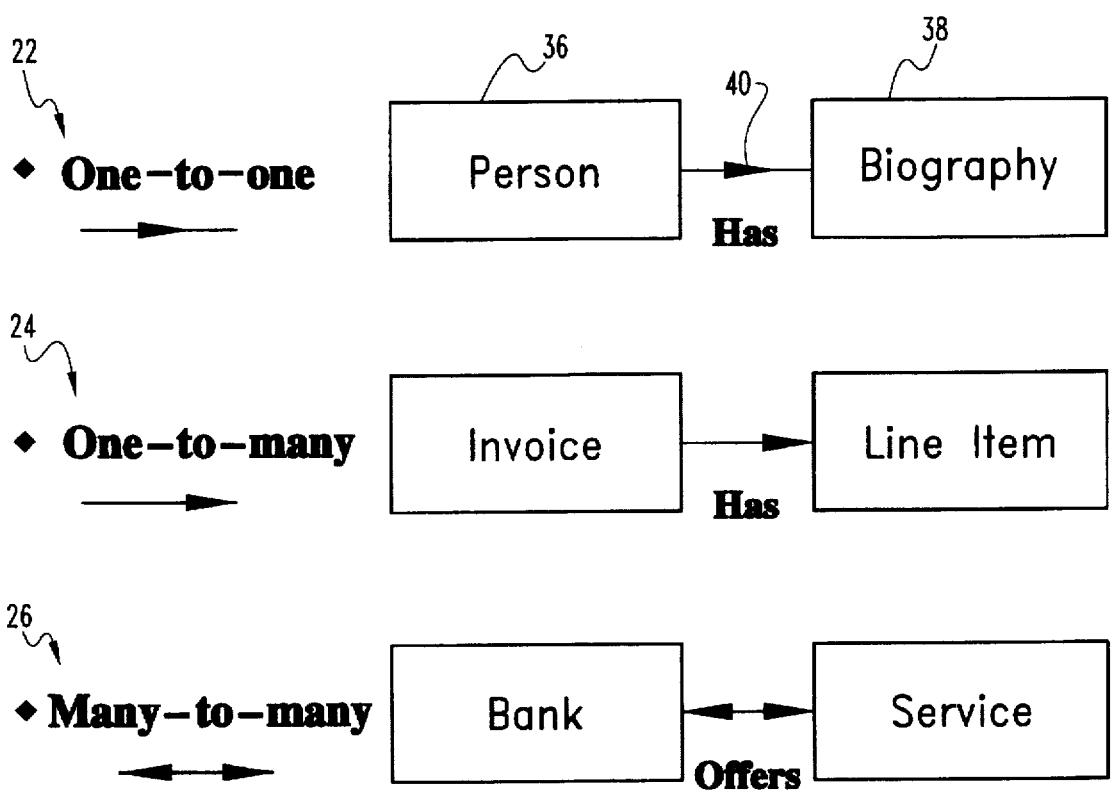
Fig. 3: Relationship Types

Fig. 4: Relationship Types
28
♦ Recursive (one−to−many)
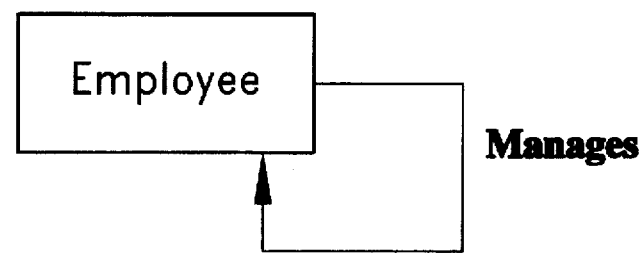
30
♦ N−ary or forked (one−to−many)
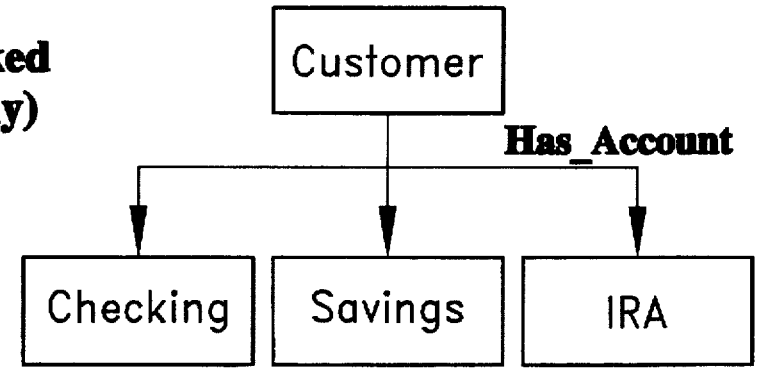

Fig. 5: Relationship Types
- Many-to-many recursive
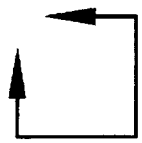
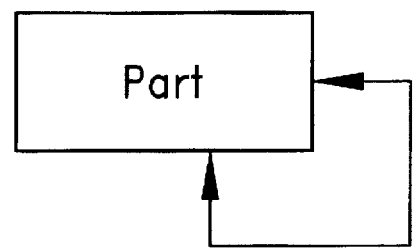
Is_assembled_from
- N-ary many-to-many recursive
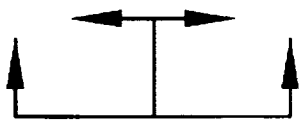
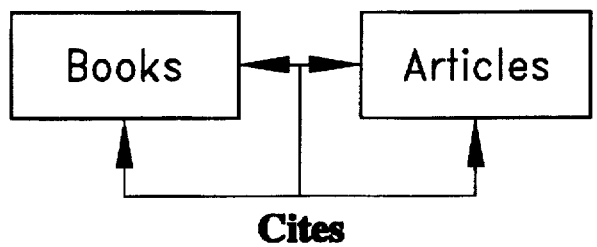
Cites

Fig. 6: Example Entity–Relationship Data Model
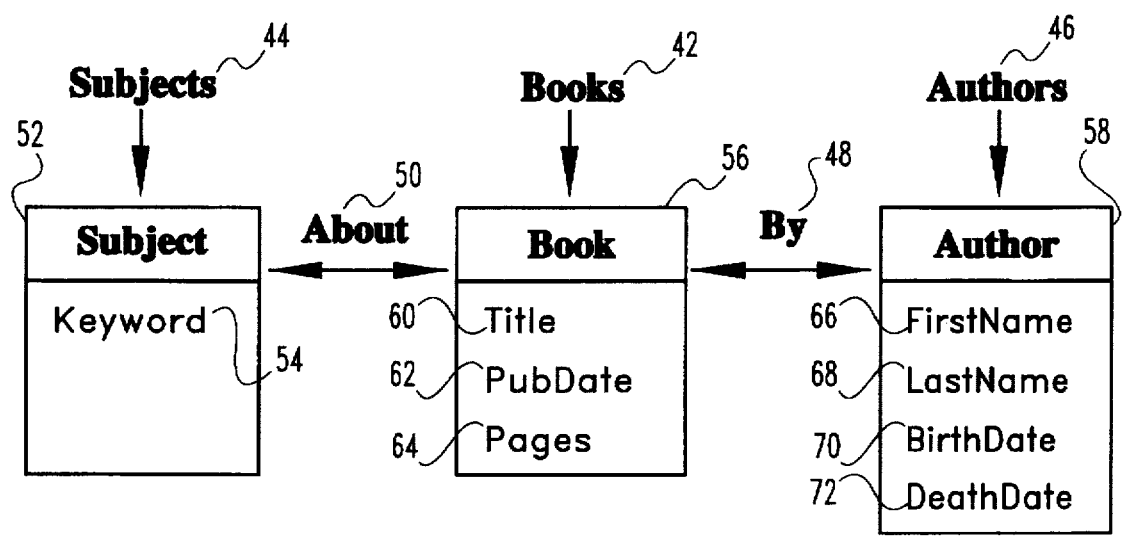

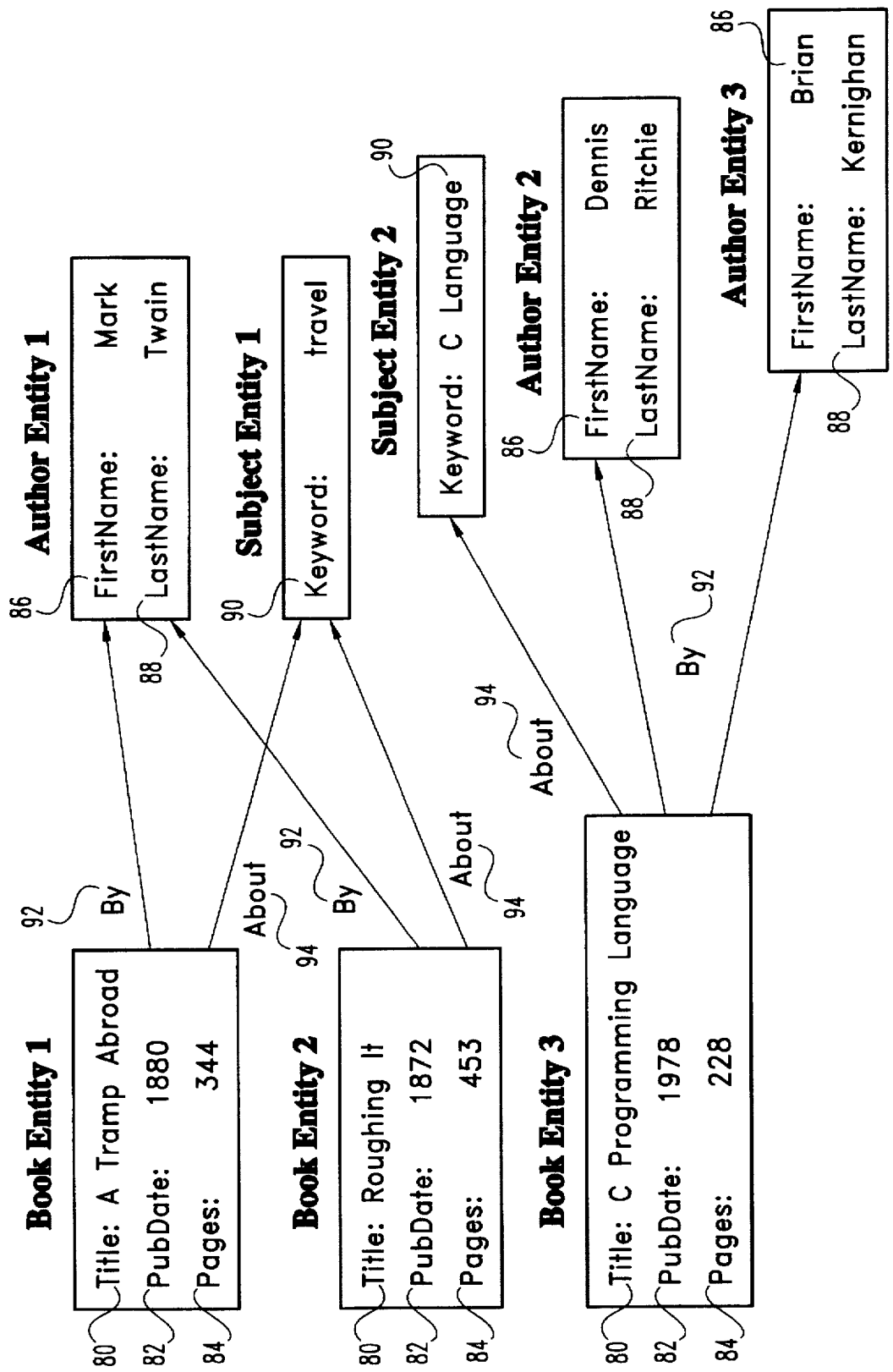
Fig. 7: Instances of Entities & Relationships

Fig. 8: 4 – Schema Architecture
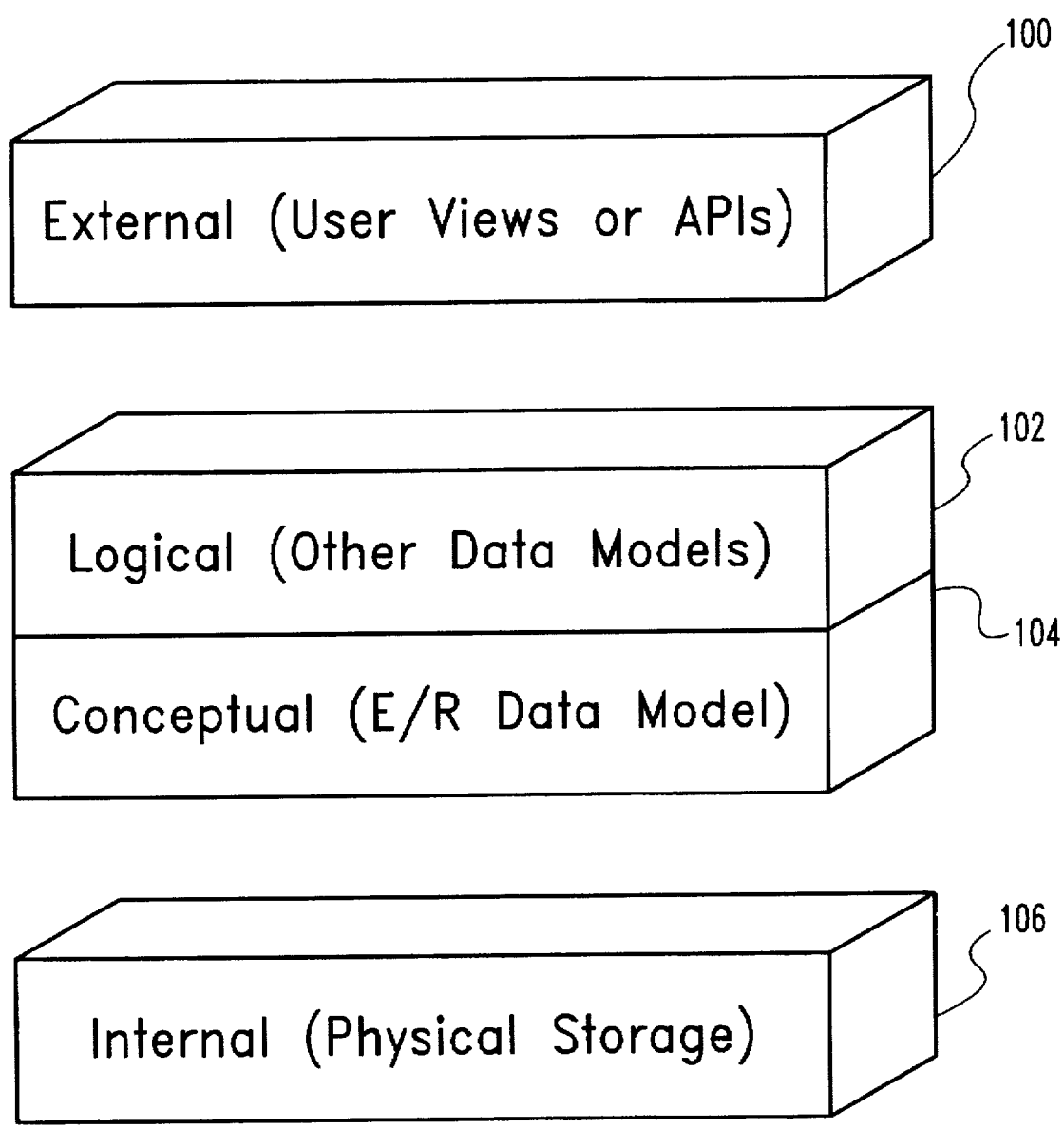

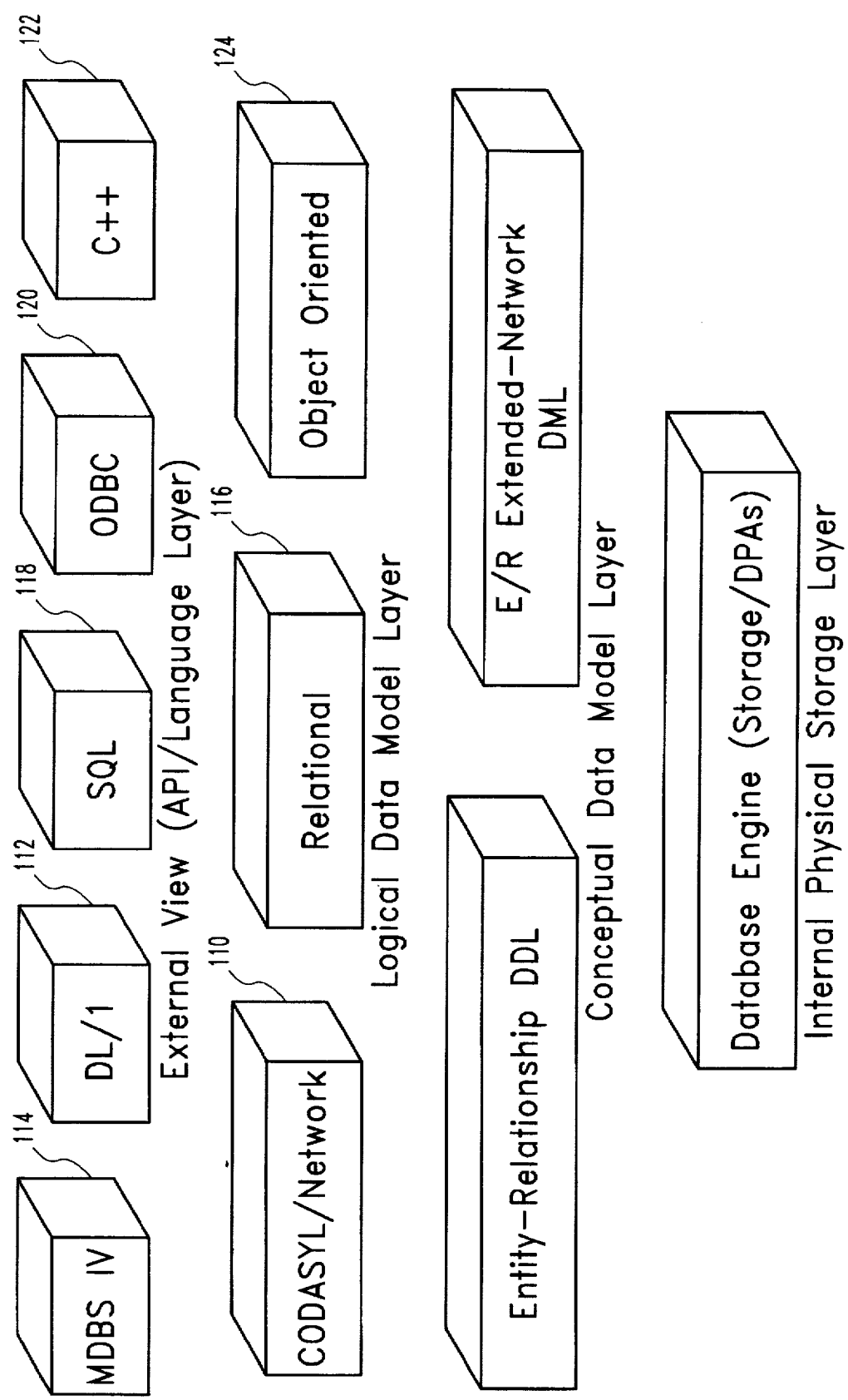
Fig. 9: Layered Architecture

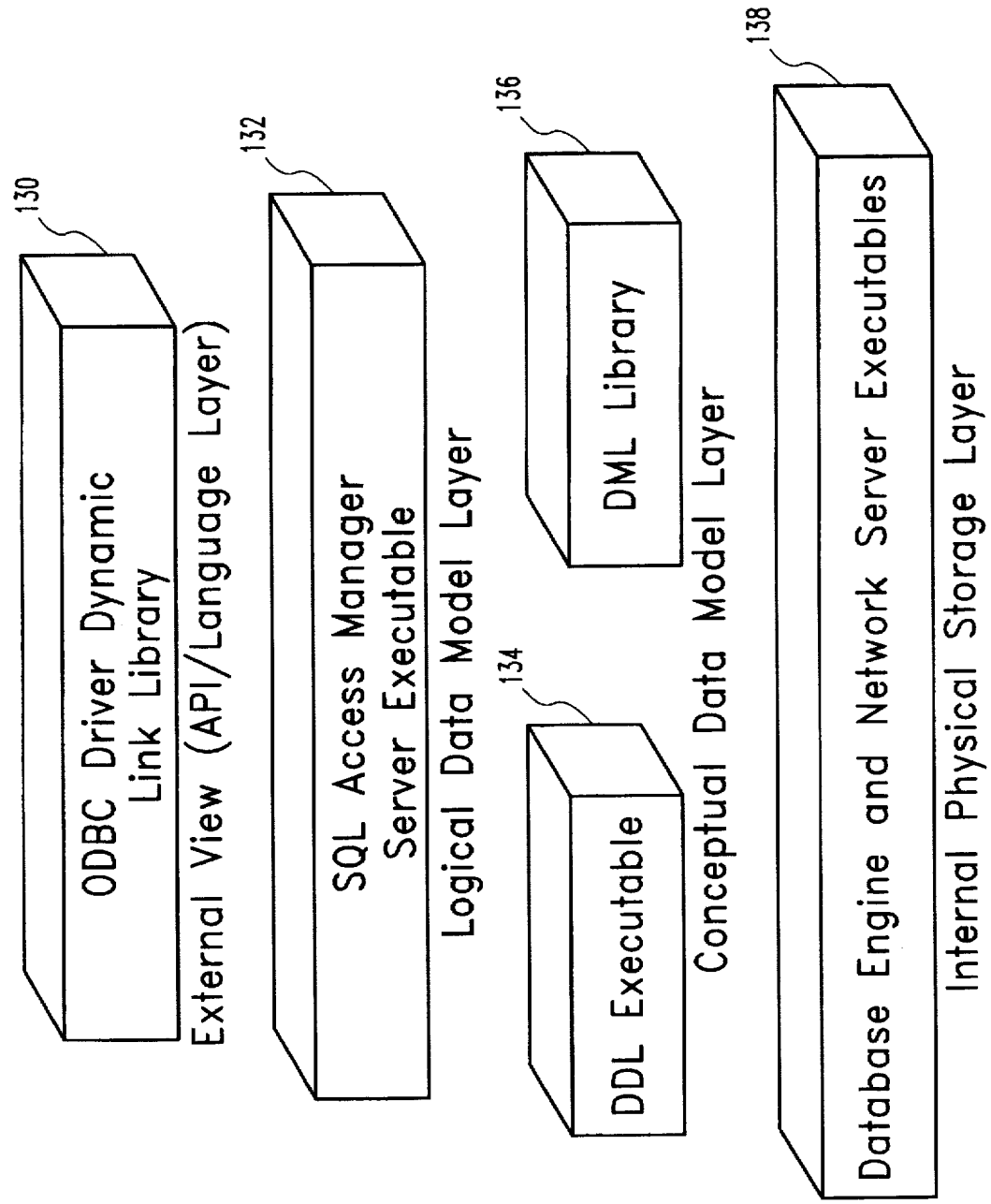
Fig. 10: SQL Layer Implementation

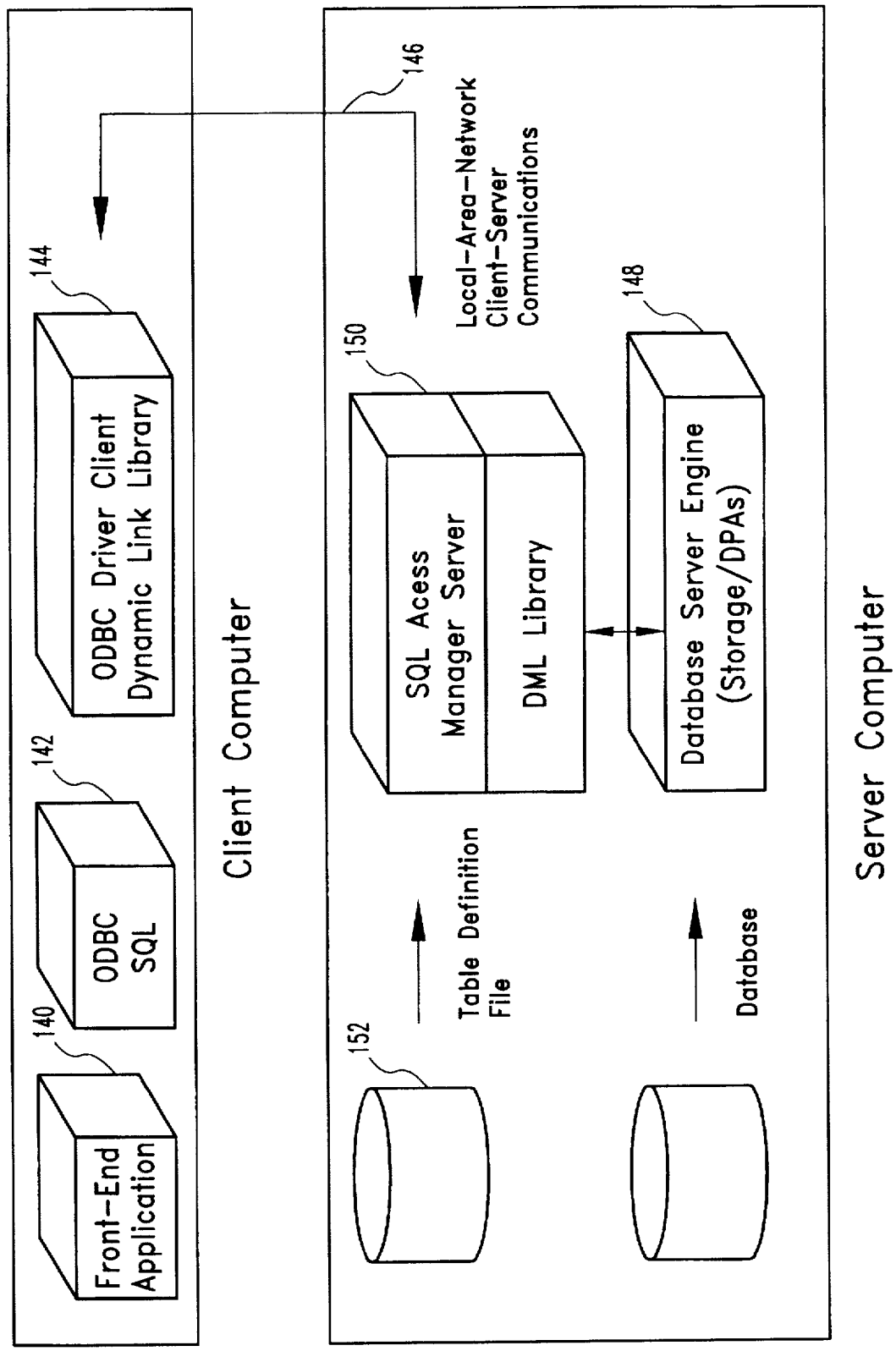
Fig. 11: ODBC SQL Implementation

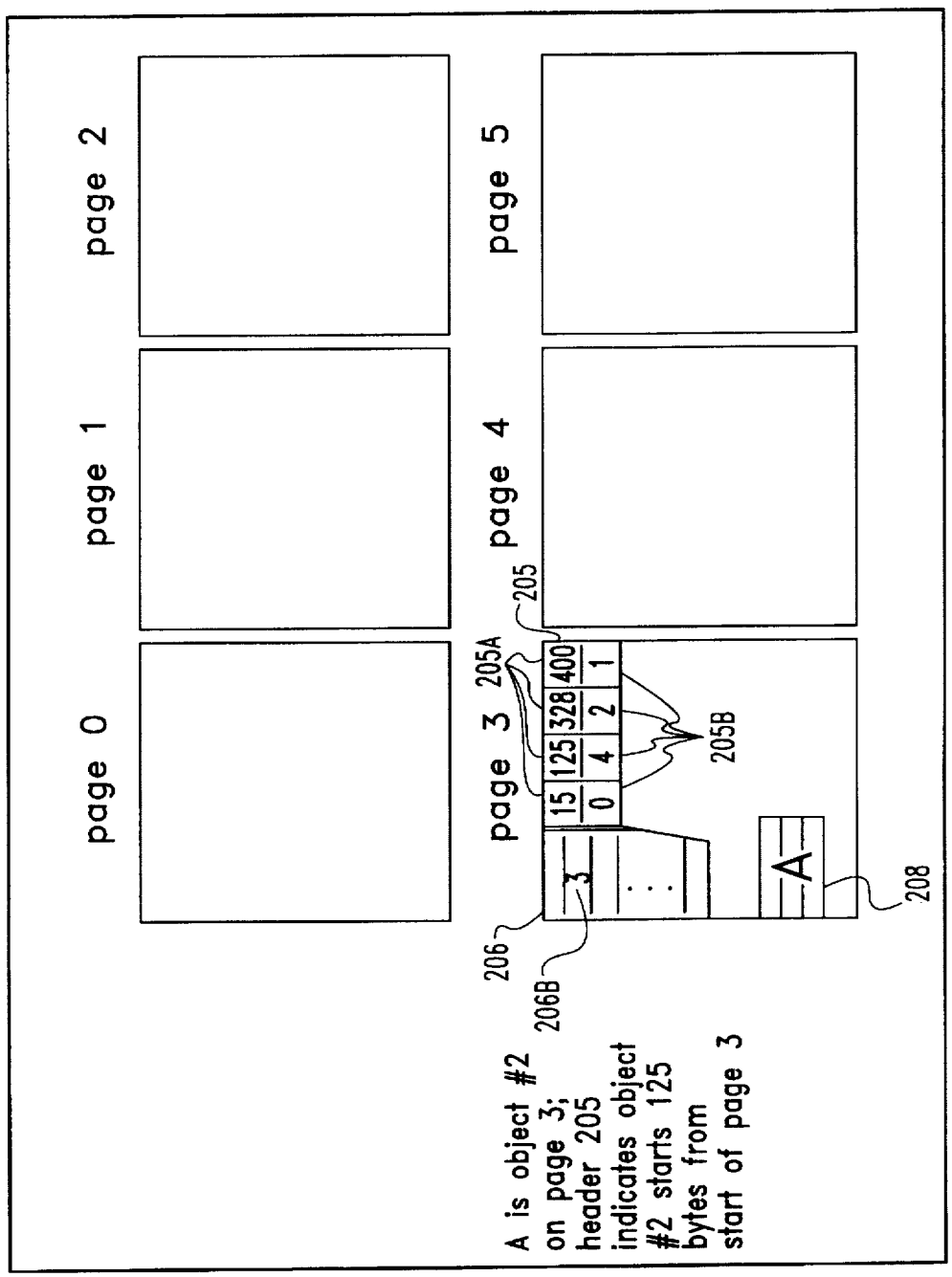
Fig. 14: DBKEY Contents

RECORD FORMAT

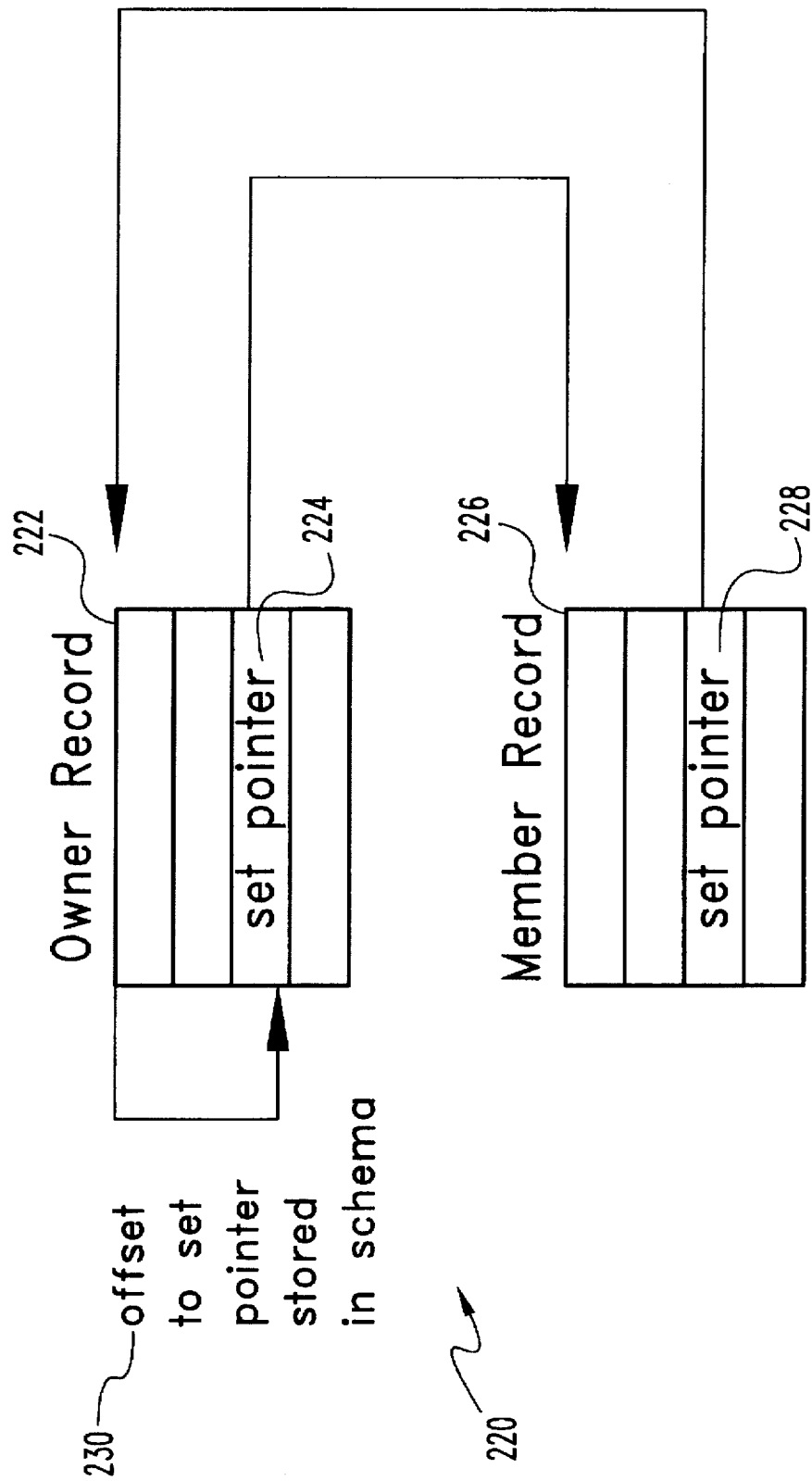
Fig. 16: Set Implementation: One-to-One relationship

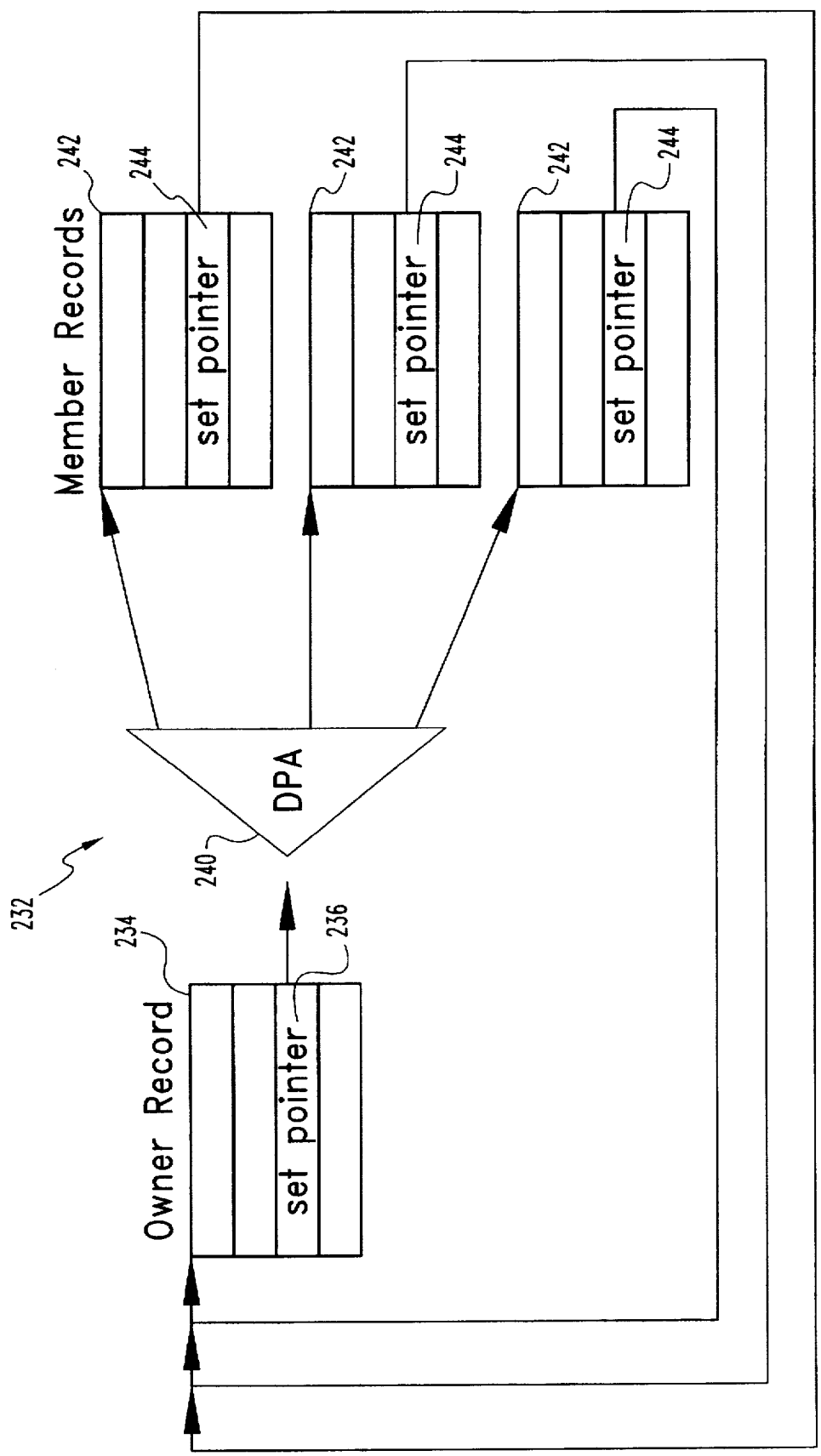
Fig. 17: Set Implementation One-to-Many relationship

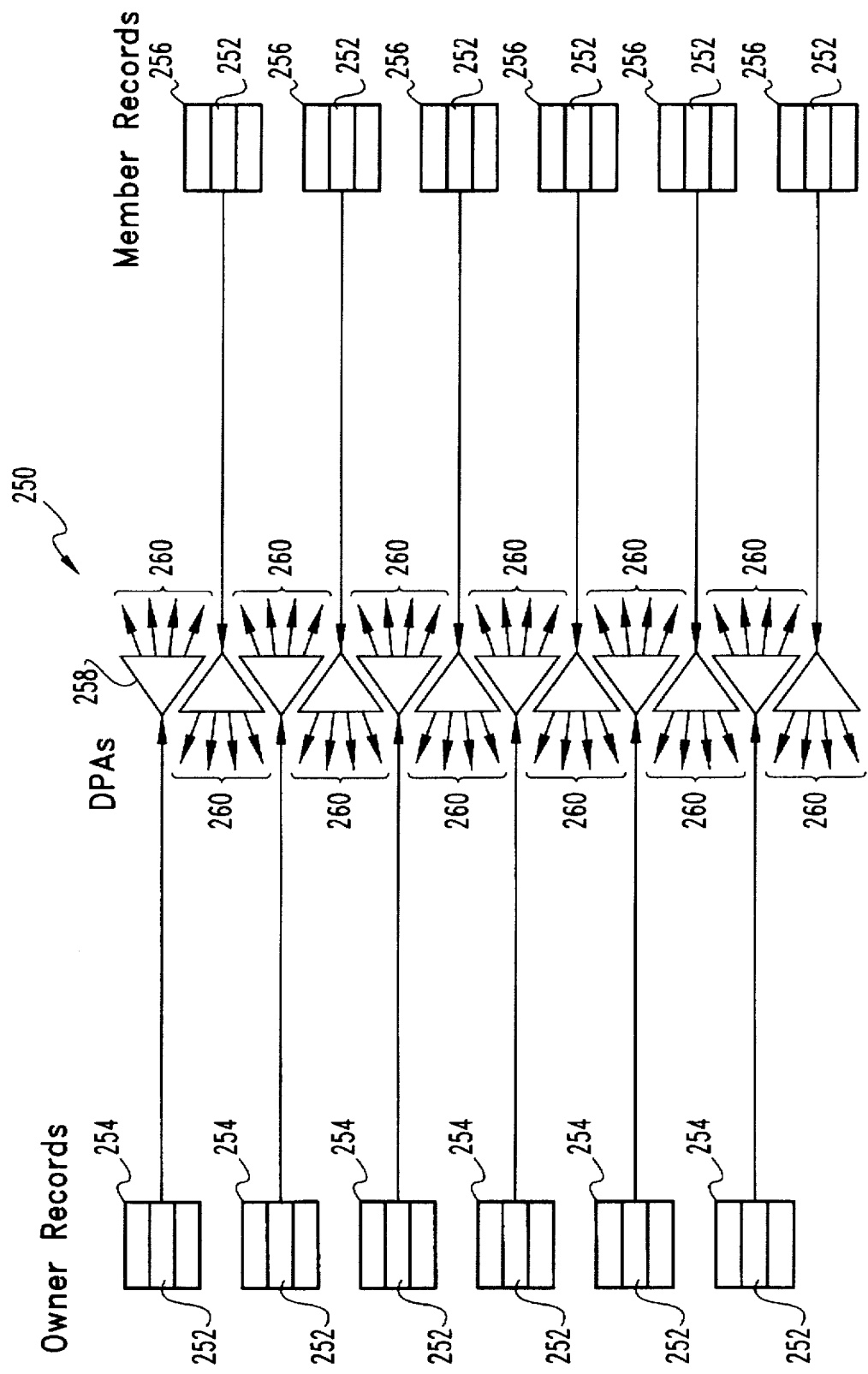
Fig. 18: Set Implementation Many-to-Many relationship

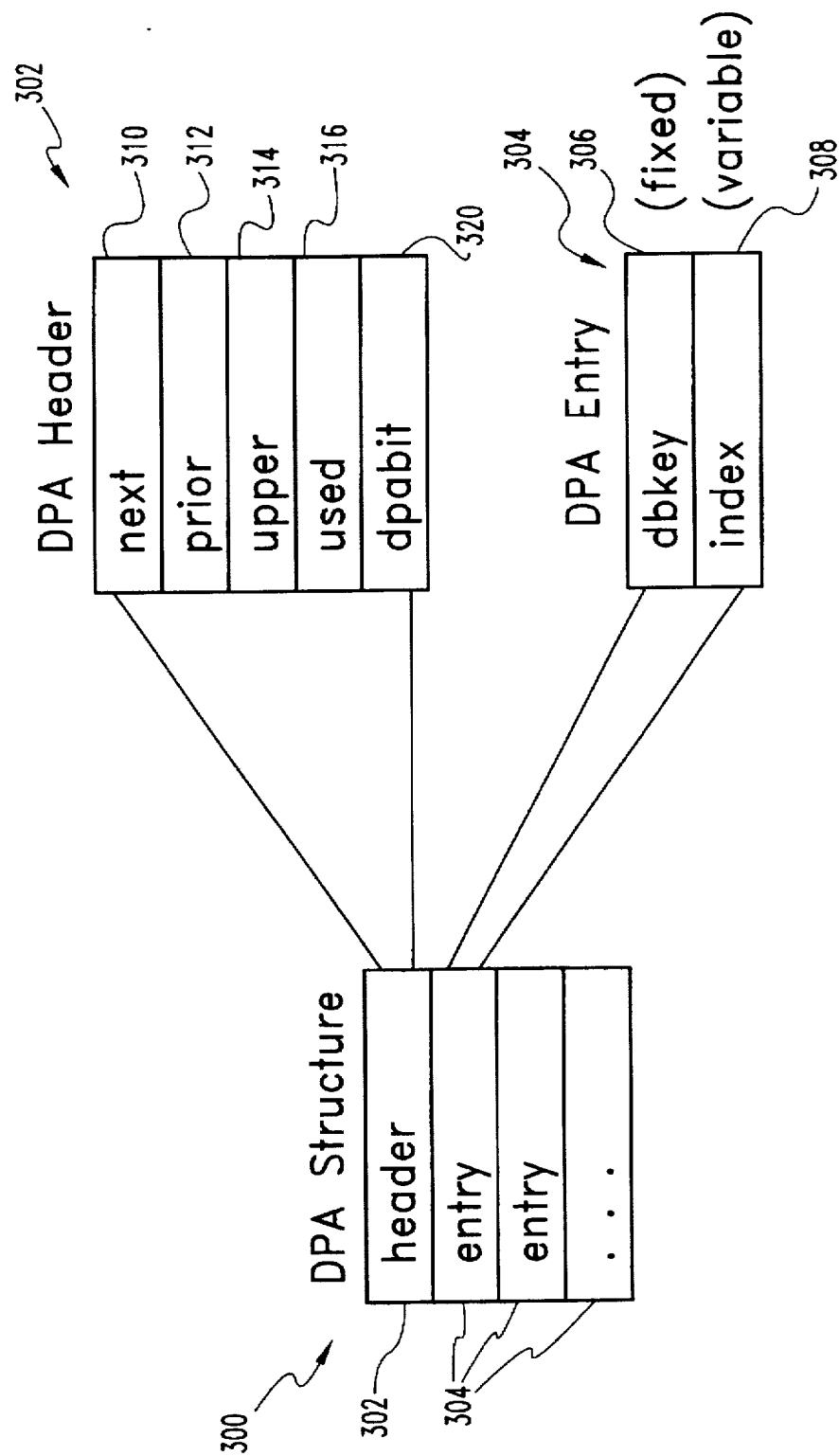
Fig. 19: DPA structure-block form

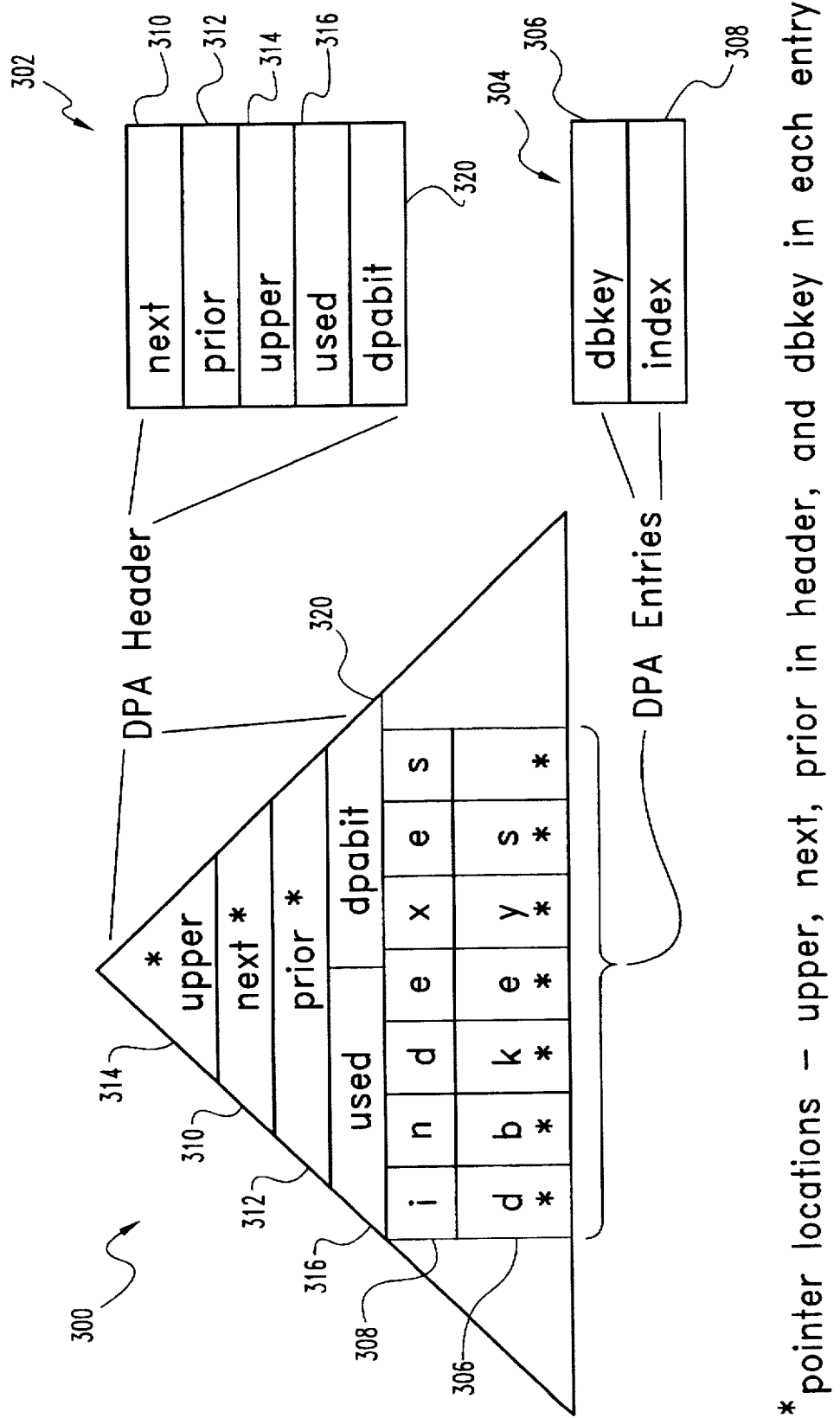
Fig. 20: DPA structure – "triangle" form detail
* pointer locations – upper, next, prior in header, and dbkey in each entry

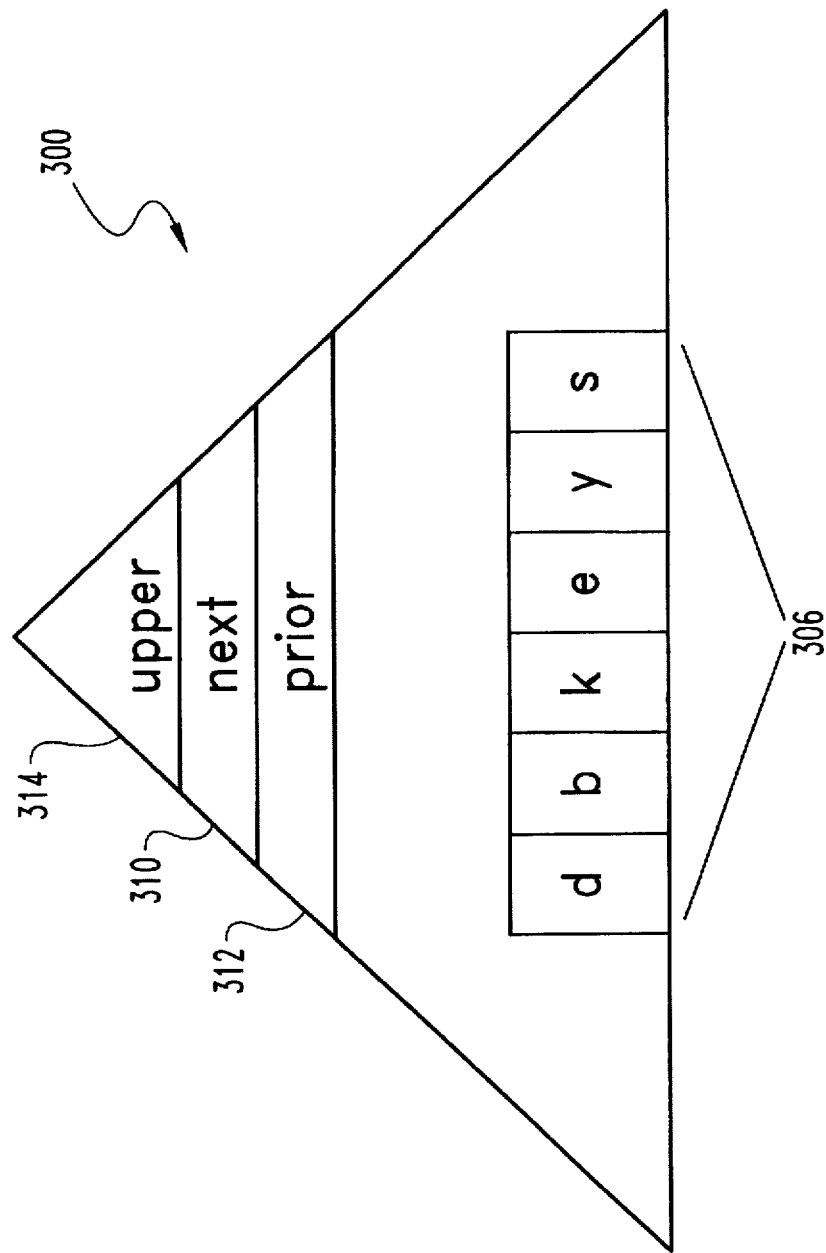
Fig. 21: DPA structure – schematic triangle showing only pointer locations

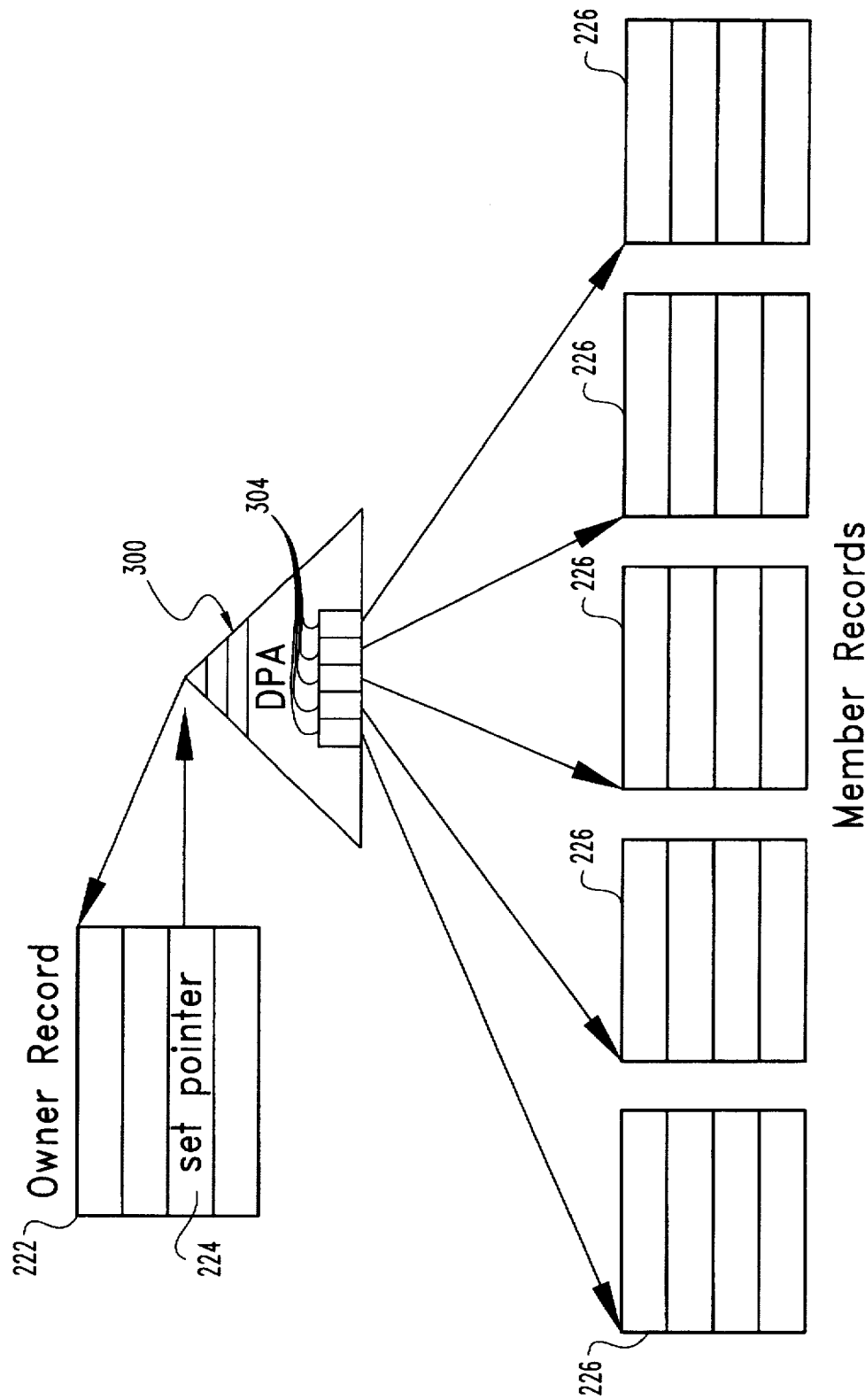
Fig. 22: DPA Set Implementation
Single DPA, sorted or non-sorted

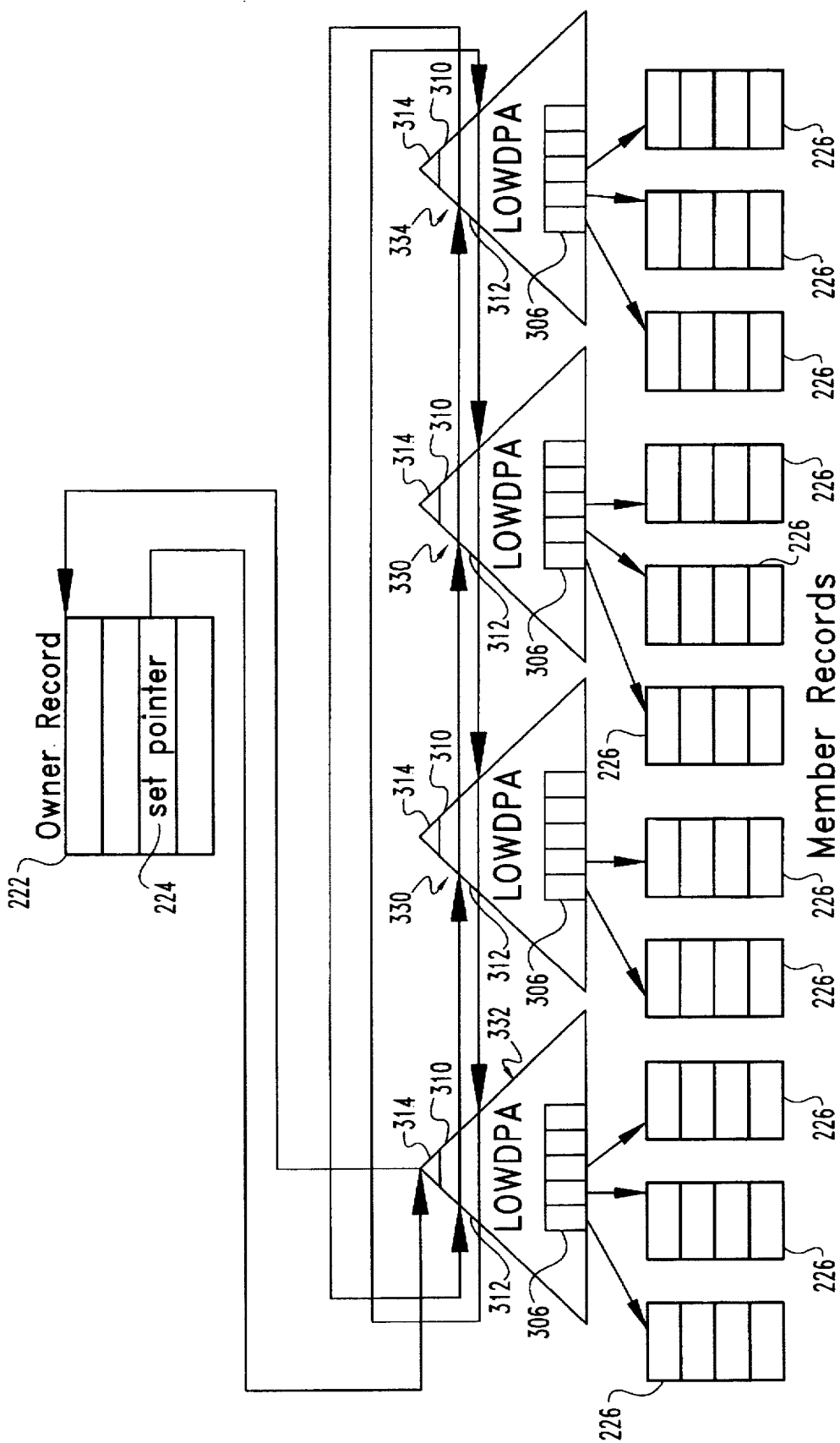
Fig. 23: DPA Set Implementation Non-sorted Multiple DPA

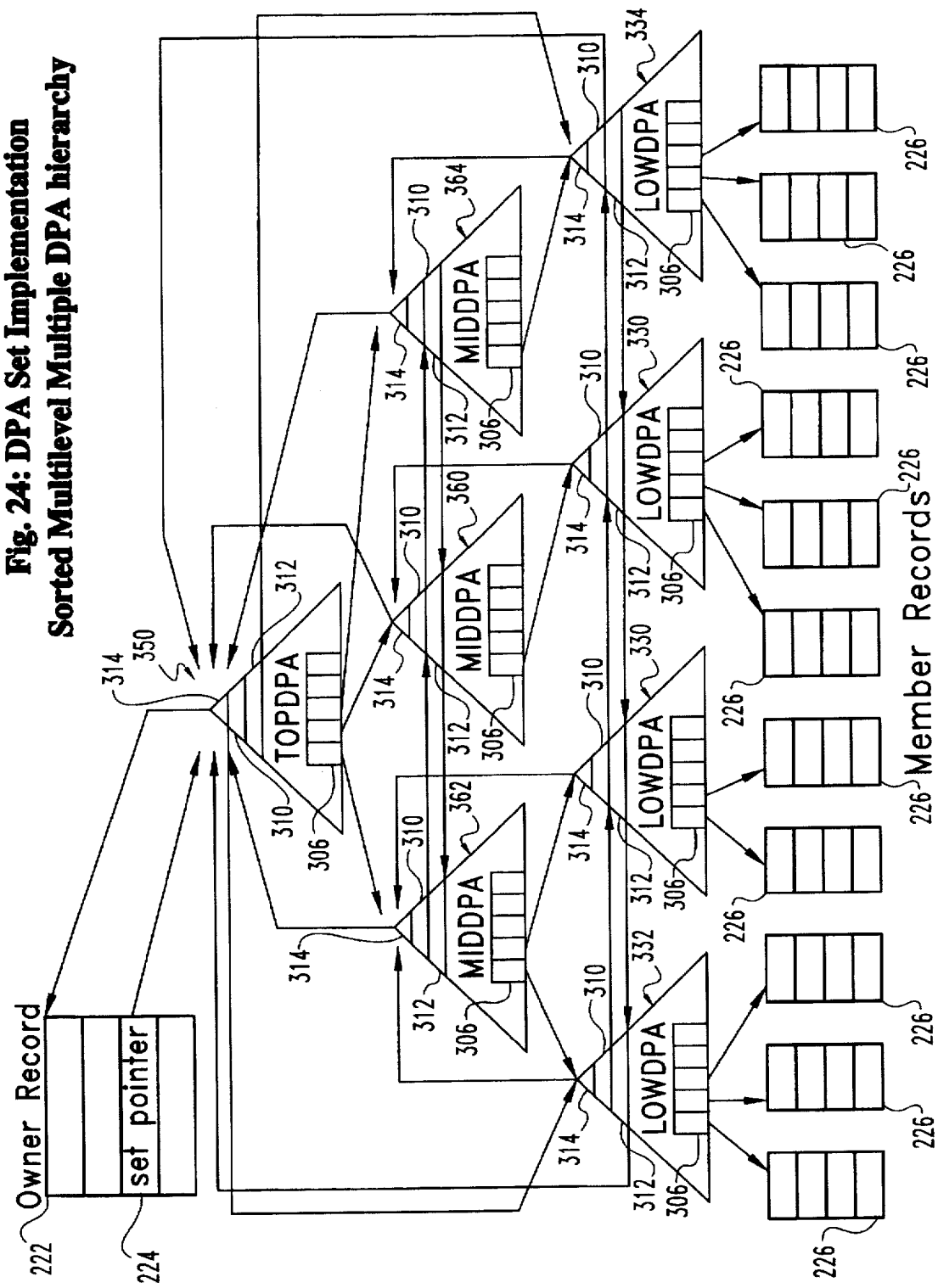
Fig. 24: DPA Set Implementation
Sorted Multilevel Multiple DPA hierarchy

Fig. 25: DPA Advantages Customers/Products Example
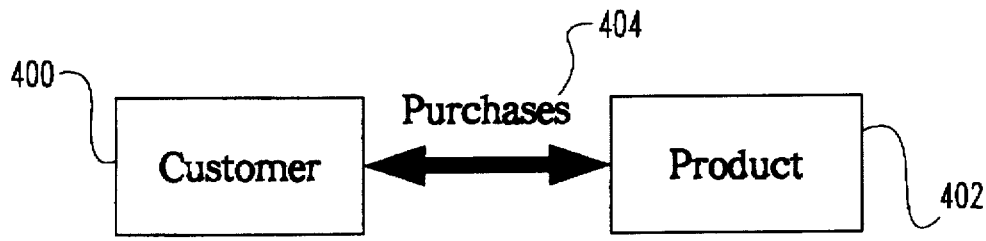
| Customers | Products |
|---|---|
| A | Push Cart |
| B | Forklift |
| C | Trailer |
| D | Hand Truck |
A - purchases Push Cart & Forklift
B - purchases Trailer
C - purchases Push Cart & Trailer
D - purchases Forklift & Hand Truck
Query: what customers have purchased products also purchased by A?

Fig. 26: DPA traversal in many-to-many set
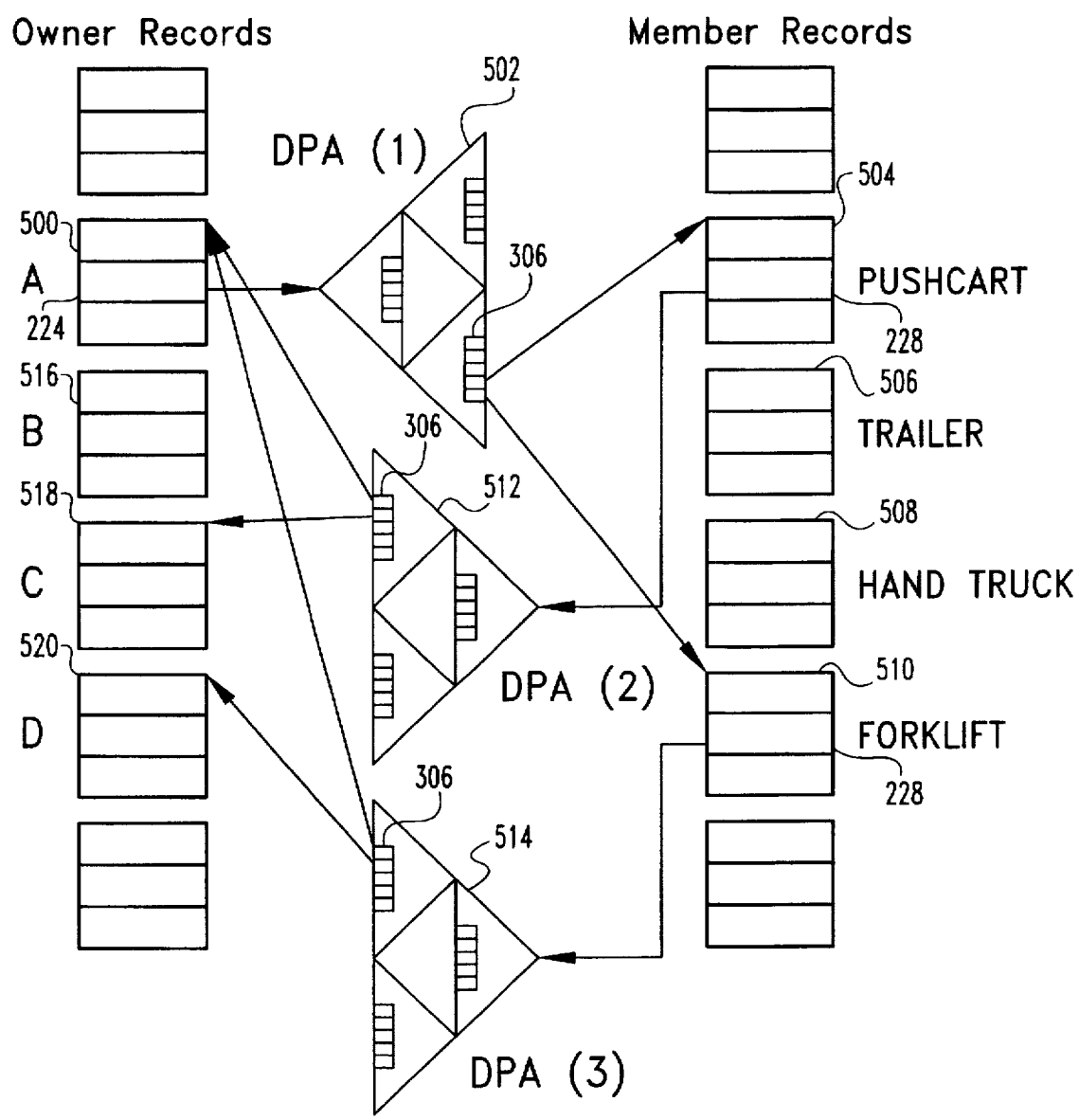

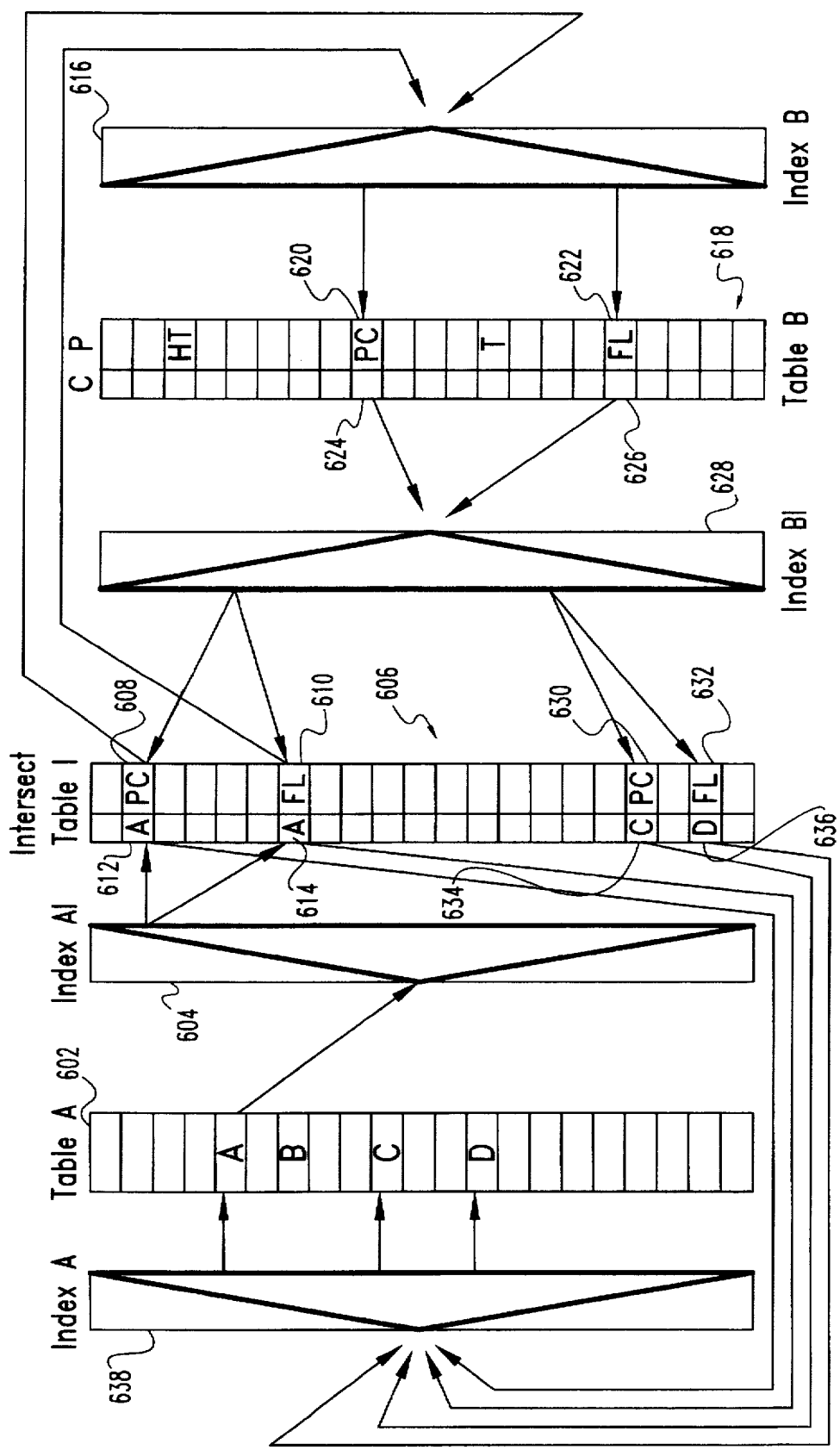
Fig. 27: Index Traversal in Relational Many-to-Many Implementation 5,713,014

MULTI-MODEL DATABASE MANAGEMENT SYSTEM ENGINE FOR DATABASE HAVING COMPLEX DATA MODELS

This application is a division of application Ser. No. 08/309,909, filed Sep. 21, 1994, now U.S. Pat. No. 5,611,176.

FIELD OF THE INVENTION

This invention relates generally to a system and method of manipulating a database, and more particularly, to a multi-model database management system (DBMS) engine for manipulating databases having complex data models.

BACKGROUND OF THE INVENTION

A database management system (DBMS) is a computer software arrangement that stores arid manipulates data. The DBMS essentially provides software routines for manipulating the stored data according to one or more data models. A DBMS may be used directly by system users, as a component of another software package or to provide various services to an independent software package.

A database is a collection of data which is managed and manipulated by a DBMS according to various logical data models, or views of stored data, within the DBMS. The most common logical data model in the present database market is the relational model, using the industry-standard SQL query access language. However, manipulating data in a relational architecture system is cumbersome, particularly for databases having complex data models. For example, manipulation of a many-to-many relationship set involves the use of tables, shared columns (foreign keys) and indexes.

A recent development in the database industry is the availability of industry-standard Application Program Interfaces (APIs) for SQL, such as SQL Access Group Call Level Interface and the related Open DataBase Connectivity (ODBC) API for Microsoft Windows. What is needed is a DBMS that supports this API and others, and that can further present to its users a variety of logical models using industry-standard interfaces, while the physical storage of data is managed in a manner that closely follows the data model. Moreover, a physical storage implementation in which data objects, such as complex data records, are linked only to data objects to which an entity-relationship exists would greatly increase the efficiency of a DBMS over present systems.

SUMMARY OF THE INVENTION

The present invention addresses the need for a DBMS engine that implements the foregoing desired tasks. According to one aspect of the present invention, a database management system for storing, retrieving and modifying data objects stored in a database is provided. The system includes a number of application processes, where each of the application processes includes a user accessible external application and one of a multiplicity of application program interfaces for translating complex input data from the external application into a predefined intermediate data format, and for translating the predefined intermediate data format into complex output data for the external application. A schema is coupled to the number of application processes and defines a number of predetermined data models for translating the predefined intermediate data format into a predetermined data model format, and for translating the predetermined data model format into the intermediate data format. Finally, a database server including storage means for storing and retrieving the data objects in and from the database is provided wherein the server stores and retrieves the data objects according to the predetermined data model format. The predetermined data model format includes a plurality of owner and member records, each having associated therewith at least some data, wherein set relationships exist between certain ones of the owner and member records. Each of the owner records of any of the set relationships are linked directly to a corresponding member record when only the corresponding member record exists in the set relationship. Moreover, each of the member records of any of the set relationships are linked directly to a corresponding owner record when only the corresponding owner record exists in the set relationship. The predetermined data model format further includes a plurality of pointer arrays for linking each of the member records of any of the set relationships to a corresponding owner record when a multiplicity of member records exist in the set relationship, and for linking each of the owner records of any of the set relationships to a corresponding member record when a multiplicity of owner records exist in the set relationship According to another aspect of the present invention, a database management system for storing, retrieving and modifying data objects stored in a database is provide wherein the system is coupled to a number of application processes each having a user accessible external application and one of a multiplicity of application program interfaces for translating input data from the external application into a predefined intermediate data format and for translating the predefined intermediate data format into output data for the external application. The database management system comprises a schema defining a number of predetermined data models for translating the predefined intermediate data format into a predetermined data model format and for translating the predetermined data model format into said intermediate data format, and a database server including storage means for storing and retrieving the data objects in and from the database. The server stores and retrieves the data objects according to the predetermined data model format which includes a plurality of owner records each having associated therewith at least some data and a number of first set pointers, a plurality of member records each having associated therewith at least some data and a number of second set pointers and a plurality of dynamic pointer arrays (DPAs) each having associated therewith a multiplicity of third set pointers. Set relationships exist between certain ones of the owner records and the member records, with each of the first set pointers corresponding to a distinct set relationship that its associated owner record participates in and each of the second set pointers corresponding to a distinct set relationship that its associated member record participates in. Each of the first set pointers points to one of a single member record and a distinct one of the plurality of DPAs, and each of the multiplicity of third set pointers of the distinct DPA points to one of the member records related to the owner record associated with the first set pointer. Moreover, each of the second set pointers points to one of a single owner record and another distinct one of said plurality of DPAs, and each of the multiplicity of third set pointers of the another distinct DPA points to one of the owner records related to the member record associated with the second set pointer.

According to a further aspect of the present invention, a database management system for storing, retrieving and modifying complex data stored in a database is provided wherein the system comprises a number of application processes, where each of the application processes includes a user accessible external application and one of a multiplicity of application program interfaces for translating complex input data from the external application into a predefined intermediate data format, and for translating the predefined intermediate data format into complex output data for the external application. A first schema coupled to the number of application processes is also included for translating the predefined intermediate data format into one of a plurality of logical data model formats, and for translating the plurality of logical data model formats into the intermediate data format. Further provided is a second schema coupled to the first schema which defines a conceptual data model for translating the plurality of logical data model formats into a conceptual data format, and for translating the conceptual data format into one of the logical data model formats. Finally, a database server including storage means for storing and retrieving the complex data objects in and from the database is provided, where the server stores and retrieves the data objects according to the conceptual data format. The storage means includes a number of files with each of the files occupying a unique location within said storage means, a number of pages associated with each of the files, the pages being variable in number within each of the files, with each of the variable number of pages occupying a unique location within each of the number of files. Each of the number of pages has an object portion for storing at least one of the database objects and a header portion for storing at least one offset number, where each of the offset numbers occupies a unique location within the header and corresponds to one of the database objects stored on the page. The storage means further includes a database key portion for storing a database key associated with each of the database objects. The database key includes a page identification portion for identifying a unique one of the pages containing the database object and an object offset portion for identifying the unique location within the header portion of the unique page containing the offset number corresponding to the database object. Any of the database objects contained on the unique page within one of the number of files is stored at a location within the unique page determined by adding the offset number corresponding to the database object to the starting location of the unique page.

According to yet another aspect of the present invention, a method of storing, retrieving and manipulating data objects in a computer system having storage means, wherein the computer system is coupled to a number of application processes each having a user accessible external application and one of a multiplicity of application program interfaces for translating input data from the external application into a predefined intermediate data format, and for translating the predefined intermediate data format into output data for the external application is provided. The method comprises the steps of (1) translating the predefined intermediate data format into an entity-relationship model format, (2) storing entities of the entity-relationship model format in the storage means, (3) pointing a first set pointer for each relationship in which one of the entities participates in to another entity if the one entity is related solely to the other entity, (4) otherwise pointing the first set pointer for each relationship in which the entity participates in to a dynamic pointer array (DPA) and performing steps (5)–(6), (5) pointing a second set pointer from the DPA to every entity related to the one entity via the first set pointer, (6) pointing a third set pointer from each of the related entities back to the one entity if the one entity is solely related to each of the related entities, (7) otherwise pointing a third set pointer from each of the related entities to a distinct DPA corresponding to a separate relationship and performing step (8), (8) pointing a fourth set pointer from each of the distinct DPAs to every entity related to the related entities, (9) performing steps (3)–(8) until each of the entity-relationships is associated with a pointer pointing to all related entities; and (10) translating the entity-relationship model format into the predefined intermediate data formate.

One object of the present invention is to provide database management system for storing complex data according to an entity-relationship data model wherein only related data objects are stored for each set relationship.

Another object of the present invention is to provide a database management system that supports access via a wide variety of application program interfaces.

A further object of the present invention is to provide a database management system having multiple logical models to complex data.

Yet another object of the present invention is to provide for efficient physical storage of data relationships.

These and other objects of the present invention will become more apparent from the following description of the preferred embodiment.

BRIEF DESCRIPTION OF THE DRAWINGS

FIG. 1 is a diagrammatic illustration showing the ANSI-SPARC three-schema DBMS architecture.

FIG. 2 is a diagrammatic illustration of a BOOK entity showing its attributes.

FIG. 3 is a diagrammatic illustration showing three relationship types.

FIG. 4 is a diagrammatic illustration showing two additional relationship types.

FIG. 5 is a diagrammatic illustration showing two further relationship types.

FIG. 6 is a diagrammatic illustration showing an Entity-Relationship data model.

FIG. 7 is a diagrammatic illustration of specific instances of Entities and Relationships for a particular example data set.

FIG. 8 is a diagrammatic illustration showing the four-schema DBMS architecture of the present invention.

FIG. 9 is a diagrammatic illustration of interfaces and logical models supported by the DBMS engine of the present invention.

FIG. 10 is a diagrammatic illustration showing relational/SQL support by the DBMS engine of the present invention.

FIG. 11 is a block diagram detailing SQL implementation for an example front-end application.

FIG. 14 is a diagrammatic illustration of the DBKEY structure and implementation in accordance with the present invention.

FIG. 16 is a diagrammatic illustration showing the implementation of a one-to-one relationship set using the record format of FIGS. 15A and 15B.

FIG. 17 is a diagrammatic illustration showing the implementation of a one-to-many relationship set using the record format of FIGS. 15A and 15B.

FIG. 18 is a diagrammatic illustration showing the implementation of a many-to-many relationship set using the record format of FIGS. 15A and 15B.

FIG. 19 is a diagrammatic illustration showing the structure of a Dynamic Pointer Array (DPA) using record format.

FIG. 20 is a diagrammatic illustration showing the DPA structure of FIG. 22 in "triangle" format.

FIG. 21 is a diagrammatic illustration showing the DPA structure of FIG. 19 in an alternate "triangle" format.

FIG. 22 is a diagrammatic illustration of DPA set implementation using a single DPA.

FIG. 23 is a diagrammatic illustration of DPA set implementation using non-sorted multiple DPAs.

FIG. 24 is a diagrammatic illustration of DPA set implementation using sorted multi-level and multiple DPAs.

FIG. 25 is a diagrammatic illustration of an example problem.

FIG. 26 is a diagrammatic illustration showing the solution of the example problem of FIG. 25 using DPA-based traversal in accordance with the present invention.

FIG. 27 is a diagrammatic illustration showing the solution of the example problem of FIG. 25 using index traversal in a relational implementation.

DESCRIPTION OF THE PREFERRED EMBODIMENT

Figure 12:
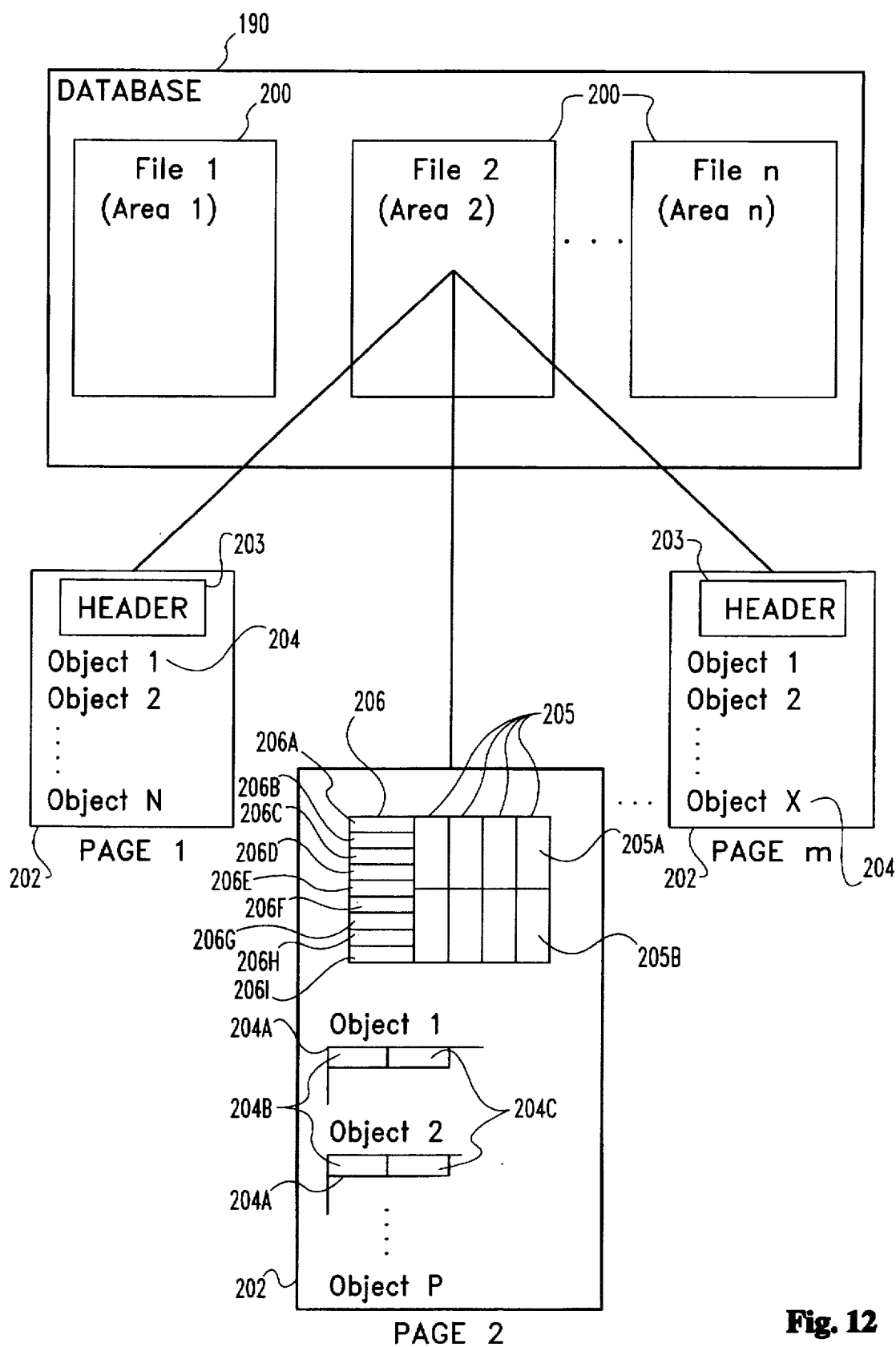
FIG. 12 is a diagrammatic illustration showing the structure and implementation of files and pages in the database according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The database management system (hereinafter "DBMS") of the present invention is a high-performance DBMS engine for databases having complex data models. It is a multi-model DBMS that can present to its users a variety of logical models or views of stored data using industry-standard interfaces while the physical storage of data is managed via a Dynamic Pointer Array (hereinafter "DPA"). DPA-based physical storage is more efficient for databases having complex data models and results in higher performance for applications based on complex data. This description of the preferred embodiment consists of the following eight parts:

1. Multi-Model structure and implementation of the DBMS according to the present invention, including an overview of data modeling and database concepts applicable to the invention,
2. Structure and implementation of a specific model—the relational model,
3. Structure and implementation of the database page and database key,
4. Structure and implementation of records within the database pages,
5. Set implementation using the record structure and implementation of the present invention,
6. DPA Structure and implementation,
7. DPA hierarchies,
8. DPA usage and dynamic modification of data relationships, and
9. An example problem implemented by the DPA-based architecture of the present invention and a comparison of this performance with a relational architecture system.

MULTI-MODEL STRUCTURE AND IMPLEMENTATION

The DBMS engine of the present invention implements a multi-level schema, standardized by the American National Standards Institute (ANSI) Standards Planning and Requirements Committee (SPARC). The (ANSI-SPARC) 3-schema model of FIG. 1 distinguishes the conceptual schema 2, relating data to other data, from the internal schema 4, seen by the computer, and the external schema 6 seen by the users in terms of screens and reports. The DBMS engine of the present invention attempts to closely integrate the internal/physical schema layer with the conceptual schema by using a physical implementation of the most flexible and general data model available, the Entity-Relationship data model. A description of this type of data model can be found in "The Entity-Relationship Model—Toward a Unified View of Data", ACM Transactions on Database Systems, March 1976, pp. 9–36 and "PRO-IV Workbench Data Modeler Reference Manual", McDonnell Information Systems (1993).

Referring now to FIG. 2, the DBMS engine implements entities as records within the database. The structure and implementation of records are more fully described hereinafter. Entity attributes are implemented as items. Thus, in FIG. 2, the BOOK entity 12 has the attributes (or items) of Title 14, Authors 16, and Publisher 18.

Relationships between entities (or records) may be of many different types as shown in FIGS. 3, 4, and 5. Specifically, relationships may be one-to-one 22, one-to-many 24, many-to-many 26, recursive 28, N-ary or forked 30, many-to-many recursive 32, and N-ary many-to-many recursive 34. Also shown in FIGS. 3, 4, arid 5, the DBMS engine of the present invention implements the various relationships directly by specific kinds of sets. The concept of owner and member entities, or records, is used for each set type to distinguish the direction of traversal. For example, in FIG. 3 the Person 36 is the owner and the Biography 38 is the member of the Has relationship 40.

Referring now to FIG. 6, an example entity-relationship data model is shown for a database of Books 42, Subjects 44, and Authors 46. The By 48 and About 50 relationships are both many-to-many, as a book can have multiple authors just as one author call write many books. Similarly, many books can address a single subject, while a single book can be about multiple subjects. The Subject record 52 contains, as its single item, a subject keyword 54. The Book 56 and Author 58 records, on the other hand, contain multiple items. For example, the Book record may contain, as items, the Title 60, Publication Date 62, and Number of Pages 64. The Author record may contain, as items, the First Name 66 and Last Name 68 of each Author, their Birthdate 70, and Deathdate 72.

A graphical data modeling tool such as McDonnell Information System's "PRO-IV Workbench" (referenced above), for example, can be used to directly translate the relationships and entities of FIG. 6 into a Data Definition Language (DDL) suitable for use by the DBMS engine of the present invention. A DDL example showing the data model of FIG. 6 in terms of records, items, and sets is shown in Table 1. As may be expected, the DDL of Table 1 defines each record and its associated attributes, and then proceeds to define the relationships between the records in terms of owner and member records.

TABLE 1

Data Definition Language for the Data Model of FIG. 6

```
/*      Books/Authors           */
/*      A sample schema         */
db books
file "books.db" size 50 pages, page size 512
/*                              define users         */
user name is "user" with "pass"
/*                              define records       */
record BOOK
        item TITLE              char 30
        item PDATE              unsigned 2
        item PAGES              unsigned 2
record AUTHOR
        item FNAME              char 20
        item LNAME              char 20
        item BDATE              unsigned 2
        item DDATE              unsigned 2
record SUBJECT
        item KEYWORD            str 16
/*                              define sets          */
set BOOKS, type 1:n
        owner SYSTEM
        member BOOK, order sorted ascending TITLE
                insertion auto
set AUTHORS, TYPE 1:n
        owner SYSTEM
        member AUTHOR, order sorted ascending LNAME
                duplicates not allowed
                insertion auto
set SUBJECTS, type 1:n
        owner SYSTEM
        member SUBJECT, order sorted ascending KEYWORD
                duplicates not allowed
                insertion auto
set ABOUT, type n:m
        owner BOOK, order sorted ascending TITLE
        member SUBJECT, order sorted ascending KEYWORD
                duplicates not allowed
set BY, type n:m
        owner BOOK, order sorted ascending TITLE
        member AUTHOR, order sorted ascending LNAME
                duplicates not allowed
end
* * * Schema description successfully analyzed * * *
```

Referring now to FIG. 7, an example of multiple instances of the Book, Subject and Author entity-relationship of FIG. 6 is shown. The Book entity has, as attributes, a Title 80, Publication Date 82, and Number of Pages 84. The Author entity has, as attributes, the author's First Name 86 and Last Name 88. The Subject entity has a Keyword 90 as its single attribute. The By 92 and About 94 relationships of this example are all one-to-many. The first two Book entities of this example are written by the same author, as indicated by the By relationship, and concern the same subject matter, as indicated by the About relationship. The third Book entity of this example has two authors, as indicated by the By relationship and concerns a single subject matter, as indicated by the About relationship. Throughout this example, the Book entities are the owner records and the Author and Subject entities are the member records.

The DBMS engine of the present invention extends the ANSI-SPARC three-schema DBMS model of FIG. 1 to the four-schema DBMS model shown in FIG. 8. Referring to FIG. 8, users of the present DBMS engine are intended to be professional computer programmers so that the "User View" 100 is expressed in terms of programming or query languages and Application Program Interfaces (APIs), rather than screens and reports. Since a great variety of languages and APIs are in general use, an advantage of the present DBMS is that it can be used by several of these languages and APIs.

Languages and APIs often have a built-in bias or worldview that corresponds to a particular conceptual or logical model for working with data. For example, the relational data model is inherent in the industry-standard SQL query language. To accommodate a variety of languages and APIs, the present invention utilizes the concept of a logical schema 102 that is related to the conceptual schema 104 but lies between it and the external schema 100 as shown FIG. 8. The entity-relationship data model, as shown FIGS. 3–6, is used as the conceptual layer 104 and is general enough to allow many other logical models within the logical schema 102 to be superimposed on it. The addition of the logical schema 102 shown in FIG. 8 allows the DBMS engine to utilize the variety of interfaces and logical models illustrated in FIG. 9.

Referring to FIG. 9, CODASYL/network model 110 databases such as DL/1 112, IMS (not shown), Unisys DMS/1100 (not shown), and MDBS IV 114 have APIs that are easily translated to a Data Manipulation Language (DML) for use by the DBMS. DML is based on an extended network concept that makes it easy to navigate and manipulate complex data relationships. A full explanation of DML is given in "Micro Database Management: Practical Techniques for Application Development", Robert H. Bonczek. Clyde W. Halsapple, and Andrew B. Whinston, Academic Press, Inc. (1984). Relational model 116 systems based on SQL 118 and SQL call interfaces such as the Sybase DB-LIBRARY (not shown), SQL Access Group Call Level Interface (SAG-CLI) (not shown), IBM/Borland IDAPI (not shown), and Microsoft's Open Database Connectivity (ODBC) API 120 are also supported by the present DBMS engine. Such relational model systems are fully explained in "A Guide to the SQL Standard: 3rd Edition", C. J. Date and Hugh Darwen, Addison-Wesley Publishing Co. (1993) and "Programmer's Reference: Microsoft Open Database Connectivity Software Development Kit v.1.0", Microsoft Corporation (1992). Finally, a C++ class library 122 implementing the ODMG-93 object-oriented logical model 124 is also supported. This interface is fully explained in "The Object Database Standard: ODMG-93", R. G. Cattell et al., Morgan-Kaufmann Publishers (1993).

RELATIONAL MODEL STRUCTURE AND IMPLEMENTATION

FIG. 10 illustrates in more detail the relational/SQL support by the present DBMS engine. A call-level-interface for programs running under the Microsoft Windows operating environment uses Dynamic Link Libraries (DLLs) 130 to implement the interface. The DLL 130 is the API that the programmer sees. Behind the DLL 130 lies a module called the SQL Access Manager 132, which implements the relational logical model, relying on a database defined by the DDL executable 134 and using the DML library 136 to obtain data from the DBMS engine at the physical layer 138.

FIG. 11 illustrates this concept in more detail. As shown in FIG. 11, a front-end application 140 such as the Microsoft Excel spreadsheet, the Trinzic Forest & Trees data access tool, or the Crystal Reports report writer, for example, is used by the end user to access data. These front-end applications are generic in nature and no specific interface to the present DBMS engine has been written for them. However, data from the DBMS engine can be accessed from these front-ends using an industry-standard call-level SQL interface such as ODBC 142. In operation, the front-end application 140 makes an ODBC API call to the ODBC driver manager 142, which then passes the request to the ODBC driver of the present invention, which is a Dynamic Link Library (DLL) 144. The DLL 144 then passes its request from the client computer via a local-area-network (LAN) 146 to a server computer running the database server 148 and SQL. Access Manager 150 of the present invention. The SQL. Access Manager 150 parses the SQL language request and obtains the data from the server 148. To do so, it uses a Table Definition File 152 provided by the application developer to manage the translation from the relational logical data model to the entity-relationship model previously discussed. An example Table Definition File defining the Book, Subject and Author entity relationship data model of FIG. 6 is shown in Table 2.

TABLE 2

Table Definition File of the Book, Subject and Author Entity Relationship of FIG. 6

```
db books
table full_book_info db sample    book.title,
                                  book.pdate,
                                  book.pages,
                                  author.fname as auth_fname,
                                  author.lname as auth_lname,
                                  subject.keyword as subject
from books, by, about
table short_book_info db sample   book.title,
                                  book.pdate,
                                  book.lname as auth_lname,
                                  subject.keyword as subject
from subjects, about, by
```

Referring to Table 2, it should be pointed out that the ability to automatically navigate the sets specified in the FROM clause of a TABLE definition in the Table Definition File 152 without regard to upstream/downstream direction (owner-to-member/member-to- owner) is unique to the SQL Access Manager 150 of the present invention.

Using the Table Definition File of Table 2, Table 3 shows the results of SQL queries on the example data of FIG. 7.

TABLE 3

SQL Query Results on the Example Data of FIG. 7

SQL>select title auth_fname auth_lname subject from full_book info where subject = 'travel'

| TITLE | AUTH_FNAME | AUTH_LNAME | SUBJECT |
|---|---|---|---|
| A Tramp Abroad | Mark | Twain | travel |
| Roughing It | Mark Twain | | travel |

SQL>select* from short_book_info where title = 'C Programming Language'

| TITLE | PDATE | AUTH_NAME | SUBJECT |
|---|---|---|---|
| The C Programming Language | 1978 | Kernighan | C Language |
| The C Programming Language | 1978 | Ritchie | C Language |

Table 4 shows example Data Manipulation Language (DML) for a query similar to the example shown in Table 3, but using an extended-network navigational approach. Referring to Table 4, the SQL Access Manager 150 translates the SQL query into DML operations as appropriate.

TABLE 4

Data Manipulation Language (DML) for an SQL query on the data of FIG. 7 using an extended-network navigational approach

```
I:fmsk subjects                      /* Find Member based on Sort Key */
   enter KEYWORD:C Language
I:smc about                          /* Set Member based on Current */
I:ofo about                          /* Obtain First Owner */
   TITLE: The C Programming Language
   PDATE: 1978
   PAGES: 228
I:soc by                             /* Set Owner based on Current */
I:ofm by                             /* Obtain First Member */
   FNAME: Brian
   LNAME: Kernighan
   BDATE: 1940
   DDATE: 0
I:onm by                             /* Obtain Next Member */
   FNAME: Dennis
   LNAME: Ritchie
   BDATE: 1943
   DDATE: 0
I:onm by                             /* Obtain Next Member */
DMS error 255-Record not found       /* No more members in this set
                                        instance */
I:ono about                          /* Obtain Next Owner */
DMS error 255-Record not found       /* No more owners in this set
                                        instance */
I:onm subjects
   KEYWORD: travel
I:smc about
I:ofo about
   TITLE: Roughing It
   PDATE: 1872
   PAGES: 453
I:soc by
I:ofm by
   FNAME: Mark
   LNAME: Twain
   BDATE: 1835
   DDATE: 1910
I:onm by
DMS error 255-Record not found
I:ono about
   TITLE: A Tramp Abroad
   PDATE: 1880
   PAGES: 344
I:soc by
I:ofm by
   FNAME: Mark
   LNAME: Twain
   BDATE: 1835
   DDATE: 1910
I:onm by
DMS error 255-Record not found
I:ono about
DMS error 255-Record not found
```

One of the benefits of the SQL Access Manager of the present invention over a relational implementation becomes apparent when accessing a large database with a complex data model. The relational model requires redundant data to implement multiple relationships. For example, when comparing the actual data instances illustrated in FIG. 7 with the result of the last query shown in Table 4, it is observed that the data for the book and subject entities are repeated. Thus, a relational database must either store the redundant data or perform a run-time join of separate SUBJECT, AUTHOR and BOOK tables to perform this query. However, the join operation in the two tables defined in the Table Definition File 152 of FIG. 11 is implicit and executes quickly. In fact, tests have shown that the approach of the present DBMS results in a 5–10 times, or greater, speed improvement for complex joins involving 3, 4, or more, record types. This speed advantage is inherent in the physical storage of the complex relationship, which is more fully described hereinafter.

DATABASE PAGE AND KEY IMPLEMENTATION

Referring now to FIG. 12, the database 190 resident in secondary storage, such as on disk, consists of a number files, or database areas 200, each occupying a unique location within the database 190. Each file further contains a series of numbered pages 202. The pages 202 of the various files 200 are numbered so that the file number co,training a particular page of interest can be determined from the page number. Each of the numbered pages 202 occupy a unique location within their respective database files 200.

Each page 202 contains a page header 203 and a variable number of database objects 204. A database object 204 may be a record or other database component to be described hereinafter. In a preferred embodiment, the page header 203 includes two parts. The first is a Page Specific Portion 206 and the second is a number of Object Position Headers 205. Each Object Position Header 205 includes an Offset Data Location 205A for storing an offset number identifying the address location of the particular database object 204 within the page 202 in relation to the starting memory address of that page. Each Object Position Header 205 further includes a Next Data Location Pointer 205B for storing the logical object number of the Object Position Header 205 corresponding to the next database object stored on the page. For example, if the first database object stored on page 2 of file 2 is a database object corresponding to Object Position Header number 4, and the second, and last, database object stored on page 2 of file 2 is a database object corresponding to Object Position Header number 3, then the Next Data Location Position Pointer 205B for Object Position Header number 4 would contain the number 3. Further, the Next Data Location Pointer 205B for Object Position Header number 3 would contain the number 0, thereby indicating that the second database object is the last database object stored on page 2.

The Page Specific Portion 206 of the page header 204 includes nine data locations used in the manipulation of data objects stored on that page. First is the Compact Page Number Location 206A which contains a number identifying both the number of the present page 202 and the number of the file 200 where the present page is located. This feature permits verification that the page read is the page desired and thus allows detection of invalid database file formats. Next, the Record List Head 206B, Hole List Head 206C and Empty List Head 206D locations contain the heads of each of three singly linked lists. The Record linked list contains a list of database records resident on the page, and the Record List Head 206B contains the Object Position Header 205 number of the first database object stored on the page. Thus, in the previous example, the Record List Head 206B for page 2 of file 2 would contain the number 4, indicating that database object number 2, corresponding to Object Position Header number 4, is the first database object stored on the page. The Hole linked list contains pointers to the address locations on the page where a database object has been deleted, and space for storing another database object is therefore available. The Hole List Head 206C contains the Object Position Header 205 number of the first available hole location. Finally, the Empty linked list contains Object Position Header 205 numbers of inactive Object Position Headers 205. An example of such an Empty linked list entry might occur when two adjacent Object Position Header 205 numbers are resident in the Hole linked list. If a large database object is to be thereafter stored on the page, and neither page location is large enough to accommodate the new entry, the second Object Position Header 205 is stored in the Empty linked list and the two page locations are merged into a common location to accommodate the new entry. The Object Position Header 205 stored in the Hole linked list remains there until the corresponding page location is made available through, for example, relocation of page storage or by deleting the newly added database object from the page. This feature prevents Object Position Headers 205 from being lost upon page reallocation. The Empty List Head 206D contains the number of the first inactive Object Position Header 205.

The count of the total number of Object Position Headers 205 allocated in the present page resides in Page Header 206E. Pack Sequence Counter location 206F and Backup Sequence counter location 206G store counters used to trace page pack operations and on-line backup activity for the given page respectively. The last two elements in the Page Specific Portion 206 of the page header 203 are a Bit Field 206H used to identify certain attributes of the page and a Checksum 206I which may be used to detect a fault in the I/O subsystem, or underlying implementation of that subsystem, which is interfaced with the present invention.

The database objects 204 begin with database object headers 204A. Each database object header contains two data locations. The first is used to store the size 204B of time database object and the second is to store the type number 204C of the database object which is used to relate the database object to the schema information.

The present invention contemplates implementing variations to the above database page implementation. First, the database object type number 204C may be omitted. Doing so requires a record header to be placed on all record objects which contain a type value for that record. Second, the Next Data Location 205B may be omitted. This requires a record header to be placed on all record objects for relating a next record object, and a separate hole header to identify allocations of free space within the page. An empty list, in this case, will not be implemented. Third, the Pack Sequence Count location 206F may be omitted. This, however, may limit the time frame in which a page pack operation can be assumed, such as automatically before an on-line backup. Fourth, the Backup Sequence Count location 206G can be omitted. Doing so, however, may limit the possible algorithms used to implement an on-line backup scheme that does not hinder performance of the DBMS engine of the present invention. Fifth, the Checksum location 206I may be omitted. Finally, an additional data location may be added to the Page Specific portion 206 to hold another linked list head pointer such as the head of a DPA, which will be more fully described hereinafter.

Figure 13:
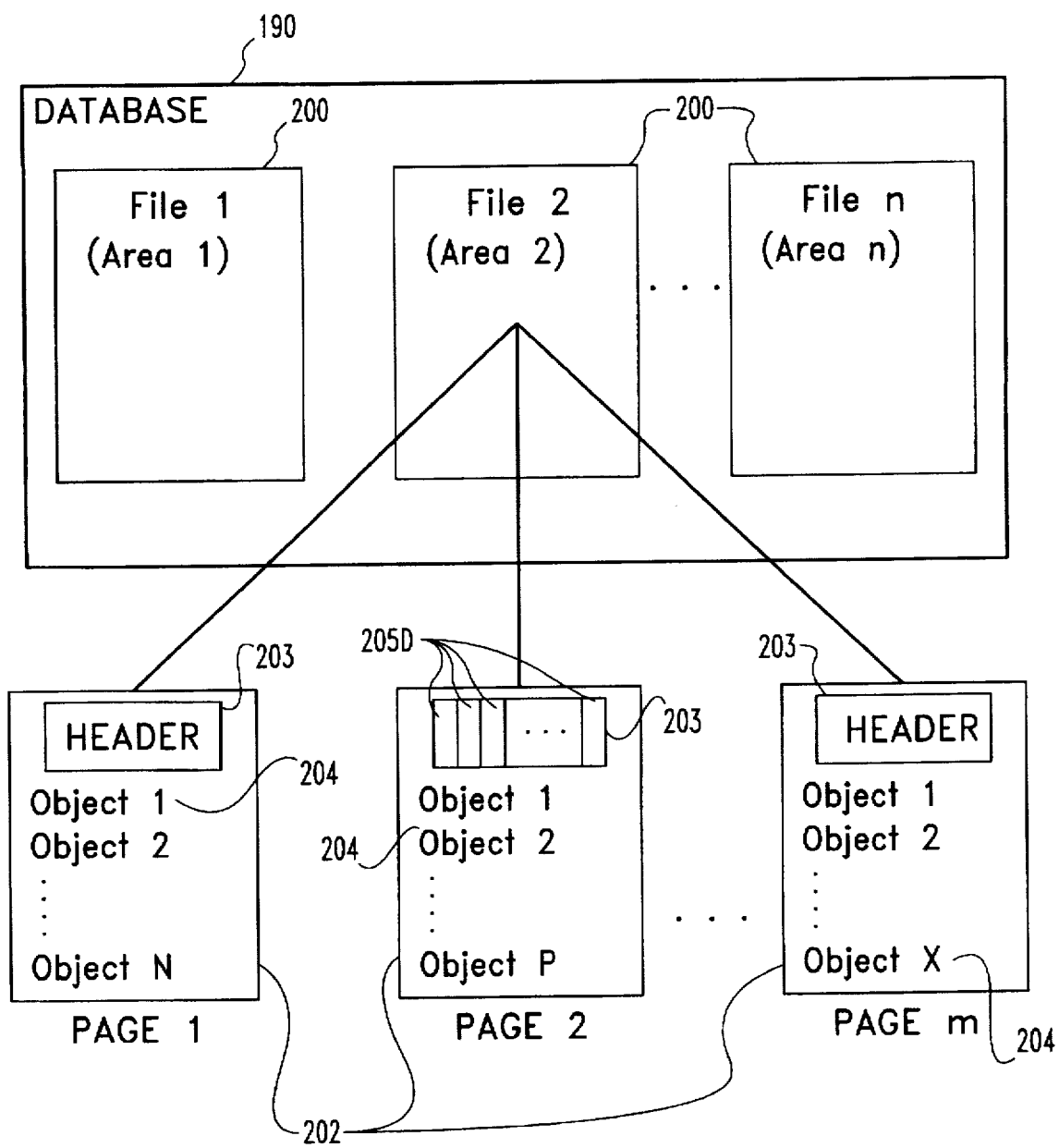
FIG. 13 is a diagrammatic illustration showing the structure and implementation of files and pages in the database according to another embodiment of the present invention.

With the foregoing variations in mind, one alternative database page implementation is shown in FIG. 13. Referring to FIG. 13, the page header 203 contains a number of offset data locations 205D for storing the offset numbers of each database object 204 contained on that page. Each offset location 205D contains an offset number identifying the location (address) of a particular database object 204 within the page 202 in relation to the starting memory address of that page.

Any object within time database may be referenced by its database key (DBKEY), which is a structure consisting of a page number and object number. To access any object, the page number of that object's DBKEY is examined to determine if the page is in a cache kept in primary storage, such as random-access memory (RAM). If the particular page is not in the cache, it is read in from that page's area file 200 on disk, where the specific file number in which to search for this page is determined from the page number itself.

Referring now to FIGS. 12 and 14, a preferred procedure for accessing a database object 204 is shown for a page 202 stored in RAM. From the DBKEY 207 of the particular object of interest, its page number and object number are retrieved. Once the page 202 of interest is located in the cache, or in the file 200, the particular object 204 on that page 202 may be accessed by looking up its offset number stored in the offset data locations 205A within the page header 203. This offset is added to the starting memory address of the page itself to compute the memory address of the database object 204. In the example shown in FIG. 14, the database object 204 is the record "A" 208. The DBKEY 207 for record A is [3:2]. Thus, record A 208 may be found on page 3 in RAM, as object number 2. The offset data location 205 in the header 204 of page 3 indicates that object number 2 starts at a 125-byte offset from the starting memory address of page 3. Thus, one method of locating record A is to simply go to the Object Position Header number 2 and add 125 bytes to the starting address of page 3.

As an example of some of the foregoing concepts, another possible method of locating record A involves reading the Record List Head location 206B for page 3. The data at this location indicates that the first record stored on the page is the record corresponding to Object Position Header 205 number 3. Reading the Next Data Location 205B for Object Position header number 3 indicates that the next database record stored on page 3 is the record corresponding to Object Position Header 205 number 2. Since database object number 2 is the desired record A 208, the data offset number found in the data offset location 205A of Object Position Header number 2 (125) is added to the starting address of page 3 to locate record A 208.

RECORD IMPLEMENTATION

Figure 15A:
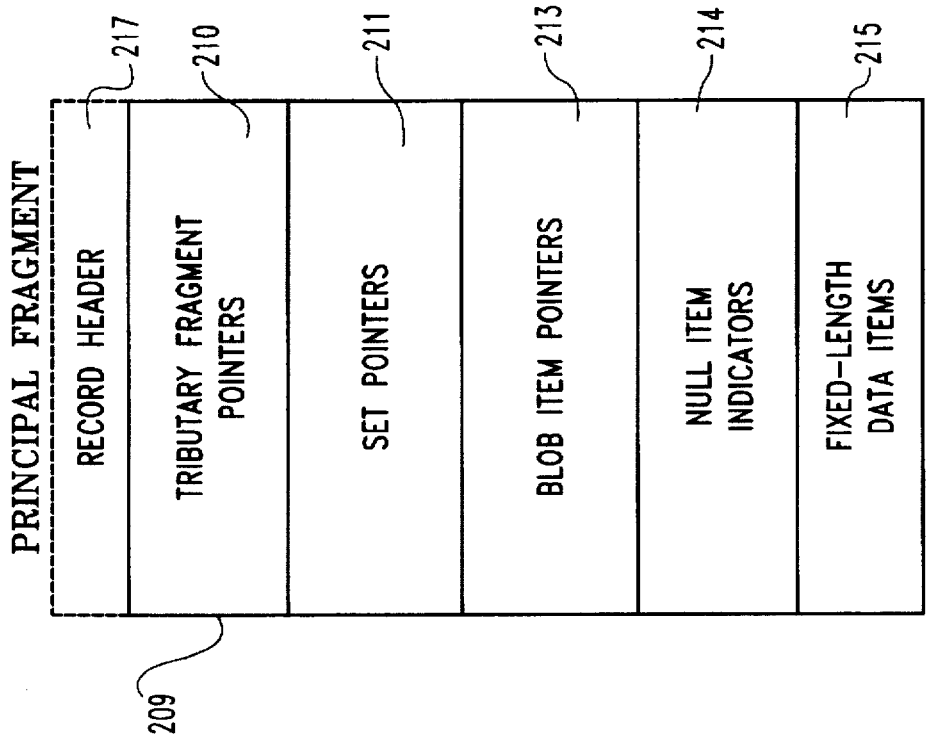
FIG. 15A is a diagrammatic illustration of the structure and format of a principal fragment of a database record in accordance with the present invention.
Figure 15B:
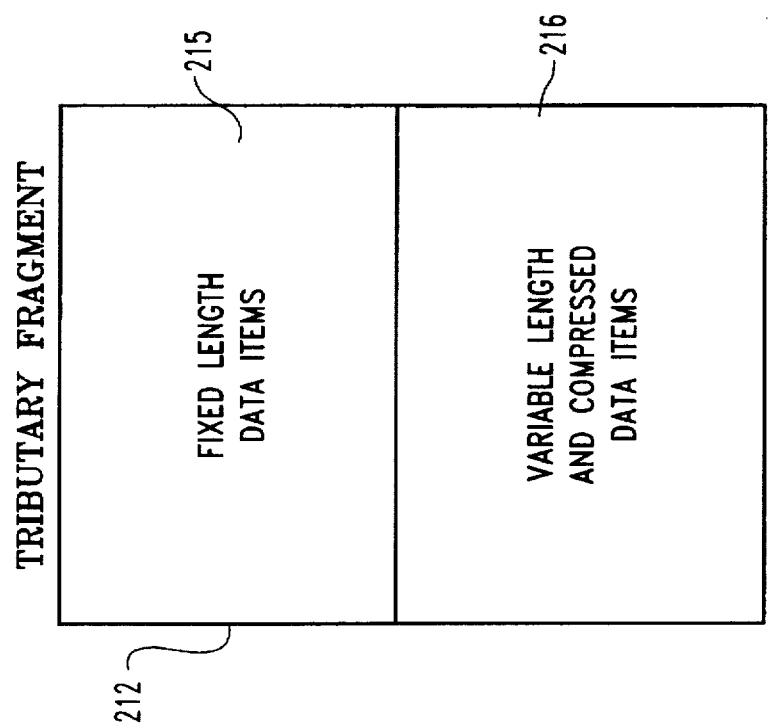
FIG. 15B is a diagrammatic illustration of the structure and format of a tributary fragment of a database record in accordance with the present invention.

A particular database object may be a record 208 as in the example shown in FIG. 14. The system of the present invention stores individual records 208 using the general format shown in FIGS. 15A and 15B. However, the actual structure for a specific record type is defined by the record description in the DDL, as shown, for example, in Table 1. Referring to FIGS. 15A and 15B, a record 208, in a preferred embodiment, is stored as one or more record "fragments". Two basic types of record fragments include a principal fragment 209 and a tributary fragment 212. The principal fragment 209 is exclusively used to contain tributary fragment pointers 210, set pointers 211, BLOB pointers 213, null item indicators 214 and fixed length data items 215. As can be seen in FIGS. 15A and 15B, the principal fragment is capable of storing fixed length data items. However, some fixed length data items 215 can be stored in one or more tributary fragments 212 as well. Each tributary fragment 212 related to a principal fragment 209 is identified by a tributary fragment pointer 210. In addition to storing fixed length data items, all variable length and compressed data items 216 must be stored in one or more of the tributary fragments 212. The actual allocation of which data items appear in a given fragment is based on the optimal way in which the fragment will fit on a database page 202 at its maximum possible size for the data items contained therein. BLOB pointers 213 are implicit set pointers used in the storage of arbitrarily large data items (ie. data item length is not known from the schema information) and null item indicators 214 are used in special instances when it is advantageous to represent data that is not actually present within the record schema. Using the database page embodiment of FIG. 12, record size and record type information may be obtained, for either the principal fragment 209 or the tributary fragment 212, from the database object size 204B and database type 204C fields respectively within the database object header 204A.

As previously explained, possible variations in the database page implementation of the previous section include the omission of the object header type value data location 204C or any of the linked lists (FIG. 12). If either or both of these items are omitted, then a record header 217 will also be contained in the principal record fragment 209 as shown by the broken line area of FIG. 15A. Record header 217 will contain the data locations corresponding to the omitted item(s).

An important part of the record structure of the present invention are the set pointers 211. Referring back to the "multi-model" section of the specification, the DDL identifies what sets a particular record type may participate in. The set pointers 211 of FIG. 15A are DBKEYS for the particular record that point to structures that relate that record to other records as previously discussed. There is a separate set pointer 211 for each relationship the record participates in.

It should be pointed out that one of the advantages of the present invention partially comes from the fact that processing set relationships for a given record instance involves only the related records for that particular record, rather than all of the records of that type or table as in a relational implementation. This structure and method of record implementation is more efficient than previous implementations, and is particularly advantageous for large databases and complex data models.

SET IMPLEMENTATION

This section explains how the entity/relationship model, discussed in the multi-model implementation section, is implemented using the record structure of the previous section. Referring now to FIG. 16, the simplest set implementation is a one-to-one set 220. The set pointer 224 for the owner record 222 points to the member record 226, and the set pointer 228 of the member record 226 points back to the owner record 222. Although shown only for member record 222, the location of the set pointer 224, or DBKEY, for a particular set relative to the start of its record, is given by the offset 230 of that set pointer 224 stored in the database schema as previously discussed. Referring now to FIG. 17, a one-to-many set 232 is shown. Here, the set pointer 236 of owner record 234 points to a dynamic pointer array (DPA) 240, represented by a triangle. The DPA is a special database object that is more fully described hereinafter. For the purposes of FIG. 17, it is only important to know that the DPA contains a number of set pointers, or DBKEYS, to all of the related member records 242. The set pointers 244 (DBKEYS) of each member record 242 point back to time owner record 234. Referring bow to FIG. 18, a many-to-many set 250 is shown. Here, the set pointers 252 (DBKEYS) of both owner 254 and member 256 records point to DPAs 258 that in turn contain pointers 260 to all of the related records. Although not shown, the set pointers of all of the related records point back to the original owner or member record.

DYNAMIC POINTER ARRAY (DPA) STRUCTURE AND IMPLEMENTATION

A dynamic pointer array (DPA) is designed to store pointers for many different kinds of relationships. The properties of the DPA must be very dynamic and able to adapt to different kinds of set structures. The DPA must hold pointers for a relationship which may contain as few as one occurrence or as many as millions of occurrences. Further, the DPA should have good performance characteristics for both small and large sets. Finally, the size of a given set occurrence must be limited only by the space available in the database, and not by the structure of the DPA itself.

FIG. 19 shows the block form structure of a DPA 300. The DPA 300 consists of one header 302 and a variable number of DPA entries 304. Each DPA entry 304 consists of a fixed-width database key element (DBKEY) 306 and a variable-width index element 308. The DBKEY element 306 is the actual location (address) in the database of the database object pointed to by this DPA entry 304. The DBKEY 306 is thus a pointer, pointing to another database object. The index element 308 is present only if the DPA 300 is used for a sorted set. If so, it contains data from the database object which is used for sorting and searching within the present DPA structure. When used for searching, the index element 308 is used to hold index information in order to allow an efficient B-tree search. Implementing a B-tree search with the present invention, however, does not lead to an academically strict B-tree because: (1) an optimally balanced tree is not maintained at all times, (2) duplicates are allowed in the index element so that a first match isn't necessarily the desired match, and (3) indexes, which are potentially only partial sort keys, may introduce even more duplicate processing than the data itself. In any event, using the index element 308 permits an efficient B-tree search of the type of B-tree implemented by the present invention.

The number of bytes consumed by the DPA entry 304 is a function of the index-width which is specified in the data definition language (DDL) description of the set. This index-width is added to the size of the database key (DBKEY) 306 and stored in the internal schema as the index, or entry, length. The index-width can only be specified for sorted sets but the entry length is always non-zero because a DBKEY 306 is always required.

The DPA header 302 has five elements. Three of these are DBKEYs, or pointers; next 310, prior 312, and upper 314. The upper DBKEY 314 points back to the database object that points to the present DPA 300. In many cases, the database object pointing to the DPA 300 is an owner or member record. DPA 300 is generally referred to as the "primary DPA and the record which is pointing to the primary DPA 300 is called the "primary record" while the records which are ultimately pointed to by the DPA hierarchy, as discussed hereinafter, are referred to as "secondary records". The prior 312 and next 310 DBKEYs are used in conjunction with DPA sets, which will be more fully described hereinafter. The remaining elements identify the DPA type and manage the variable number of entries. The first of these elements, used 316, is a two-byte unsigned integer containing a count of the total number of DPA entries which are in use. It should be pointed out that by using the database page embodiment of FIG. 12, the total number of entries allocated to a DPA can be determined from the database object size stored in the database object size field 204B of the database object header 204A for the given DPA. As with the record implementation of FIGS. 15A and 15B, if the database object size field 204B is omitted from the database page implementation, such as in the database page embodiment shown in FIG. 13, DPA size information will be included within the DPA header 306.

Used entries are always physically packed next to the header, leaving the free entries at the end of the used entries. Although this type of implementation is not necessary for unsorted sets, the entries must be kept physically adjacent in sorted sets for the binary search process. The last element, dpabit 320, is a single-byte bit field that identifies the type of the DPA. The dpabit 320 thus keeps track of the relative relationship of a DPA to other DPAs in a given set occurrence.

A DPA 300 is conventionally represented as a triangle with a block of pointers along the base line in diagrams that show physical relationships. FIG. 20 shows this convention incorporating all DPA information, and FIG. 21 shows this convention, showing only pointer locations. Since FIGS. 20 and 21 illustrate merely an alternative way of representing a DPA 300, the DPA elements are numbered identically to those in FIG. 19.

DPA HIERARCHIES

The maximum number of entries to be stored in a single DPA is limited by the total size of the DPA 300, including the header 302 and all entries 304. The DBMS engine of the present invention does not support database objects larger than a single page, so the total DPA size is limited to the size of one database page (202 of FIG. 12). One reason for this limitation is because binary searching of the index fields of the DPA becomes inefficient as the DPA becomes too large.

An instance of a set relationship using one DPA 300 is shown in FIG. 22. The set pointer 224 of the owner record 222 points to the starting address of the DPA 300, conventionally shown as pointing to the apex of the triangle. The entry DBKEYs 304 point, in turn, to each of the related member record instances 226. The set pointers of the member records and any related DPAs are not shown in this and subsequent DPA diagrams, for simplicity. The internal structure of the DPA 300 is the same, whether it is used for owner-member or member-owner navigation.

In order to allow a set instance to span multiple DPAs, the present invention implements two basic DPA hierarchies to be used by all set relationships. For non-sorted sets, the individual DPAs are chained together on a single level which provides for lateral movement from one DPA to the next. All example of this type of hierarchy is shown in FIG. 23, wherein the next 310 and prior 312 pointers for each LOWDPA 330 are chained together for quick processing of commands to find the first, next, previous, and last member of a set. For each LOWDPA 330 in the chain, except for the first LOWDPA 332, the prior pointer 312 points to the previous LOWDPA 300. The prior pointer 312 of the first LOWDPA 332 points to the last LOWDPA 334 in the chain. Similarly, the next pointer 310 of each LOWDPA 330, except for the last LOWDPA 334, points to the next LOWDPA 330 in the chain. The next pointer 310 of the last LOWDPA 334 points to the first LOWDPA 332 in the chain. The upper pointer 314 of the first LOWDPA 332 points back to the owner record 222 and the set pointer 224 of the owner record 222 points to the address location of the first LOWDPA 332 in the chain. Naturally, the DBKEYs 306 of each LOWDPA 330, 332 and 334 point to the appropriate member records 226.

For sorted sets, a complete multi-level hierarchy is built to support the ability to do a binary search. An example of this type of hierarchy is shown in FIG. 24. At each level in the hierarchy, individual DPAs are chained together to provide for lateral movement within the given level, as in the non-sorted case. The DPA hierarchy is built up from a single LOWDPA 330 created to hold the first pointer inserted in the set. After this LOWDPA 330 has grown to capacity, the TOPDPA 350 is added and, as more and more members are inserted into the set, DPAs and the various levels of hierarchy are added as needed. Although the number of levels is not intrinsically limited, FIG. 24 shows three types of DPA levels which are used to identify appropriate operations as the hierarchy grows (with insertions) and shrinks (with removals). Each DPA header 302 is marked with bits in the dpabit field 320 with one, and only one, of the three types: TOPDPA, MIDDPA, or LOWDPA.

DPAs of the type LOWDPA 330 are kept in the same chain at the lower most level in the hierarchy. Analogous to the LOWDPA chain of FIG. 23, these LOWDPAs 330 have entry pointers (DBKEYs) 306 that point to the member records 226 participating in the set relationship. For the other DPA types, TOPDPA 350 and MIDDPA 360, the entry pointers (DBKEYS) 306 point to DPAs in the next lower level and the index value 308 is a copy of each of the lower DPA's first entry index value. When more than one level of DPAs are required, as shown in FIG. 24, a single DPA at the top most level, TOPDPA 350 is always maintained, marked by TOPDPA in its dpabit field 320.

Any more levels that must be added once the TOPDPA 350 and LOWDPA 330 chains are established are MIDDPA 360 levels and are marked by MIDDPA in the dpabit field 320. Although FIG. 24 shows only one MIDDPA chain, there could be multiple MIDDPA chains. In reality, a DPA hierarchy would have to grow to point to several dozen member records 226 in order to require the eight DPAs shown in FIG. 24, which shows the second and third MIDDPAs 360 and 364 each with only one entry pointer to a LOWDPAs 330 and 334 respectively. In other words, FIG. 24 illustrates a proper structure, but it would be unlikely to occur in an actual database.

The first and last DPA of each chain level is marked in its dpabit field with FSTDPA and LSTDPA bits, respectively. If a level consists of just one DPA, it is marked with both FSTDPA and LSTDPA bits such as the topmost DPA, TOPDPA 350. The DPA chains are constructed as a doubly-linked lists using the next 310 and prior 312 header fields as chain pointers. The next pointer 310 points to the next DPA in the chain and the prior pointer 312 points to the preceding DPA in the chain. Where the chain pointers have no meaning, such as a prior pointer 312 for the first DPA in the chain and a next pointer 310 for the last DPA in the chain, the next 310 and prior 312 header fields are not used as chain pointers, but rather for special conditions called position pointers. For example, TOPDPA 350 uses the next header field 310 to point to the first LOWDPA 332, and the prior header field 312 to point to the last LOWDPA 334.

The DPA header field upper 314 is a pointer used to update pointers to the DPA if the DPA is moved. For TOPDPA 350, the upper header field 314 points back to the owner record 222. In the remaining sorted DPAs, the upper header field 314 is used to point to the DPA in the next higher level which contains an entry pointer (DBKEY) 306 to the given DPA. To update the position pointers, the first LOWDPA 332 uses the prior header field 312, and the last LOWDPA 334 uses the next header field 310, to point to the TOPDPA 350.

DPA USAGE AND DYNAMIC MODIFICATION

In finding a desired entry in a given set relationship, the operations required to complete such a find involve many variables. First, the flavor of the DMS function called by the application is the first indication of first, last, next, prior, by-key, by-item, by-relative-count. The second variable depends on whether the find is advancing from the owner or the member side of the specified set relationship. The third variable depends on the name specified in the argument string or command line.

The DMS maintains a pointer cache which is used to keep track of a current position in a specific DPA. The preferred implementation of the pointer cache is based upon the schema where a pointer cache entry is defined for all set owners and members which use DPAs. The pointer cache entries are allocated on a per user basis allowing each run time user to maintain a separate pointer cache.

Inserts in general must first find where an entry is to be inserted, and into which DPA, if a DPA structure already exists. If the record to be inserted is the first record of a many record set relationship to be inserted, then the find operation is omitted and a first DPA must be allocated in which to do a simple insert. Otherwise, a find operation must be performed to determine where, in the DPA, the record is to be inserted. This determination depends on the set type, and the Table 5 shows the type of field operation used for various set types.

TABLE 5

| Find Operations For Various Set Types | |
|---|---|
| Set Type | Find Operation Used |
| SORTED | Find by sort key |
| IMMAT | No find, if pointer cache is empty, first is used |
| LIFO | Find first |
| FIFO | Find last |
| NEXT | Find current |
| PRIOR | Find current minus one |

Once time DPA and entry position are known, the insert is completed in one of three possible ways: (1) simple insert, (2) growth insert, or (3) a DPA split.

A simple insert is possible if the DPA at the point of insertion has at least one entry free for use. The operation then continues by moving the entry at the point of insertion and all of those that follow down by one entry position. Time the new entry, DBKEY 306 and index portion 308, if an index is used, is copied into time newly vacated entry Position and the DPA header field used 316 is incremented by a value of one. If the point of insertion is the very first entry then the new index value 308, if one is used, must be Propagated up to the next higher level DPA recursing up time DPA hierarchy as long as the index being updated is the first entry in that DPA or until the TOPDPA 350 is reached.

A growth insert is required if the DPA at the point of insertion has no more free entries. The operation consists of trying to allocate a new DPA which is incremented in size by time current size available. The increment is then reduced by the value necessary to keep the resulting DPA to a size that will not exceed the main area page size less its header. If time resulting increment is no more than 2 entries larger than the existing DPA or if all areas which allow pointers are found not to have space enough to allocate a DPA of the incremented size, then the growth insert fails and a split insert is used. Following a successful growth insert, the DPA's pointed to by the next 310 and prior 312 chain and position pointers must have their prior 312 and next 310 pointers updated to point to the new DPA, respectively. In a similar fashion the upper 314 Pointer is used to find the DPA or record which has time DBKEY 306 pointer to the old DPA which is then updated with the DBKEY 306 of the new DPA. Once the new larger DPA is allocated all of the entries from the original DPA are copied to the new DPA, the original DPA is returned to free space, then a simple insert is executed on the new DPA.

A DPA split is the case where a new DPA is added. If an entire multi-level hierarchy exists, as is the case for a sorted set, a DPA split may cause another DPA split to happen when the newly added DPA is inserted into the next higher level of DPA's. The worst case example of this is when split inserts recurse all of the way up to the topmost DPA which has to be split. This requires the creation of a new topmost DPA, which in effect starts a whole new level of DPA's. The split operation consists of first allocating a similar sized DPA and chaining it into the same level following the original DPA. The entries are then split between the two DPA's based on the order defined for the given set. For FIFO sets all entries are left in the original DPA and a new empty DPA is chained onto the end wile re a simple insert places the first entry into it. For LIFO sets all of the entries are copied into the new DPA and a simple insert is used to insert the first new entry into the original. For all other set types, half of the entries are copied into the new DPA and the simple insert happens to whichever DPA now has the appropriate point of insertion. As the DPA entries are copied, the DPA header 302 is also copied from the original DPA to the new DPA. Next the chain and position pointers are fixed by setting the next 310 field in the original DPA header to the DBKEY 306 of the new DPA, then setting the prior 312 field in the new DPA header to the DBKEY 306 of time original DPA, and setting the prior 312 field of the DPA pointed to by the original DPA next 310 field to the DBKEY 306 of the new DPA. To finish the update of the chain pointers it must be ensured that the FSTDPA bit is not set in the dpabit 320 field of the header 302 of the new DPA and the LSTDPA bit is not set in the dpabit 320 field of the original DPA. If the order of the set is SORTED and the original DPA is not the primary DPA, then the DBKEY 306 in the upper 314 field is used to locate the DPA in which to find a point of insertion for the new DPA and all entry formed before it is inserted. If the original DPA, and hence the new DPA, is not marked as a LOWDPA 330, all of the entries in the new DPA are used to correct the upper 314 pointer in the DPA header 302 of each DPA that is pointed to by the DBKEY 306 of the entry. If the set order is SORTED and the original DPA was the primary DPA, a new primary DPA must be created which will be marked with TOPDPA 350 in time dpabit 320 field of the new primary DPA header 302, have both the original DPA and the new DPA inserted as entries and use the original DPA header upper 314 field update the primary record pointer to the newly created primary DPA. Next, to update the position pointers, next 310 and prior 312 are set in the header 302 of the new primary DPA. Also the upper 314 filed in the header 302 of both the original DPA and the new DPA must be set to the DBKEY 306 of the new primary DPA.

Removes in general are based from some currency indicator so the DBKEY 306 of the record being removed is known, the exact DPA entry must be found which contains that DBKEY 306 in order to remove it. First the pointer cache must be examined to determine whether the exact entry indicated is the DBKEY 306 sought to be removed and failing that, all of the entries in the DPA indicated by the pointer cache are examined for the desired DBKEY 306. Failing that, the set must be searched for the desired DBKEY 306. If the set is sorted the record data is copied to a scratch a buffer for use as the sort key and all matches are searched for the known DBKEY 306, otherwise an outright exhaustive linear search must be conducted. Once the DPA and entry are found, the remove is completed in one or three possible ways: a simple remove, a shrinking remove, or a collapsing remove.

A simple remove is possible if the entry being removed is not the last entry in the DPA and once the entry is removed it does not meet the measurement for shrinking. The operation continues by moving all of the entries that follow the entry being removed up one position which overwrites the entry being removed. The DPA header field used 316 is decremented by a value of one and its resulting value is checked to see if it meets the measure for a shrinking remove.

The condition on whether to shrink the size of a DPA after a simple remove has been completed is if the number of free entries has reached the value of the complied in deletion increment, INCDEL (presently 50), which has been chosen as the level of empty DPA entries considered to be worth keeping. The number of free entries is computed from the object size 318 (in the object header) of the DPA less the known length of the DPA header divided by the known DPA entry length. If this condition is met, the DPA is shrunk in size by one half the INCDEL value multiplied by the known DPA entry length. The position of the remaining space is computed from object size less the shrink size. The remaining space is then returned to free space, thus completing the shrinking remove.

A collapsing remove is necessary if the entry being removed is the only entry in the DPA. This operation consists of saving the next 310, prior 312, upper 314, and dpabit 320 fields for later use and returning the entire DPA back to free space. The saved next 310, prior 312, and dpabit 320 fields are then used to update the appropriate chain and position polluters. This update process recurses the DPA hierarchy as long as the last DPA entry at a given level must be removed, or until the TOPDPA 350 is reached. The update process first examines the saved dpabit 320 field for the TOPDPA 350 bits. If the TOPDPA 350 bit is found, next step is to set to NULL the referring DBKEY 306 pointer from the primary record which is found by the saved upper 314 and that would complete the update process due to the TOPDPA 350 condition. If the TOPDPA 350 termination condition is not met, the update process is continued by setting the next 310 field in the header of the DPA pointed to by the saved prior 312 to the saved next 310 and set the dpabit LSTDPA bit if the saved dpabit 320 has the LSTDPA bit set. The update process continues as the prior 312 field in the header of the DPA pointed to by the saved next 310 is set to the saved prior 312 and set the dpabit 320 FSTDPA bit if the saved dpabit 320 has the FSTDPA bit set. Finally if the saved upper 314 is not NULL the DBKEY 306 of the deleted DPA is searched for in the DPA pointed to by the saved upper 314 and that entry is removed whereupon another update pass is recursed if a collapsing remove is required or the pointer cache entries are completed and updated.

EXAMPLE

FIG. 25 shows an example that can be used to illustrate the performance of the architecture of the present invention, and its use of DPAs to implement data relationships. The data model of FIG. 25 shows Customer 400 and Product 402 entities with a many-to-many relationship, Purchases 404. One customer can purchase many products, and a particular product may be purchased by many customers. In the example, the Customers are owner records A, B, C, and D, and the Products include the member records Push Cart, Forklift, Trailer, and Hand Truck. In this example, it is known that Customer A has purchased a Push Cart and a Forklift, Customer B has purchased a Trailer, Customer C has purchased a Push Cart and Trailer, and Customer D has purchased a Forklift and a Hand Truck. In order to answer the query, "what customers have purchased products also purchased by A?", a many-to-many set traversal must be performed. The implementation of this set traversal in DPA-based physical storage is shown in FIG. 26. Beginning with record A 500, the record instance for Customer A, the following steps must be performed to answer the query:

1) Follow the set pointer 224 for the Purchases relationship to DPA(1) 502 which points to the related member Product records.
2) Follow the entry pointers (DBKEYs) 306 in DPA(1) 502 to the member records. Each member record pointed to by DPA(1) 502 indicates a Product purchased by Customer A. The DBKEYs 306 of DPA(1) 502 point to the Push Cart member record 504 and the Forklift member record 510, indicating that Customer A has purchased a Push Cart and a Forklift.
3) To determine the identifier of all purchasers of the products found in step 2, follow the set pointer for the upstream (member-to-owner) relationship in each product instance back to a DPA that points to the related owner records. The set pointer 228 of the Push Cart member record 504 points to DPA(2) 512, and the set pointer 228 of the Forklift member record 510 points to DPA(3) 514.
4) Follow the upstream set pointers (DBKEYs) 306 in DPA(2) 512 and DPA(3) 514 back to the appropriate members. One pointer of each DPA(2) 512 and DPA(3) 514 points back to the Customer A record 500, meaning that Customer A purchased a Push Cart and Forklift as was known. The remaining pointer of DPA(2) 512 points to Customer C, indicating that Customer C has also purchased a Push Cart. Similarly, the remaining pointer of DPA(3) 514 points to Customer D, indicating that Customer D has also purchased a Forklift. Thus, the answer to the query of FIG. 28 is "Customers C and D".

Performing the same traversal in a relational architecture system requires more steps as shown in FIG. 30. Rather than using the concept of records and sets, a relational database uses tables, shared columns (foreign keys) and indexes. In addition, a many-to-many set requires an intersect table to hold the duplicate shared column values (in our example, the customer name and product name) from both the owner table and the member table. To answer time query set out in FIG. 28, the following steps must be performed:

1) Starting at row A (corresponding to Customer A) in the owner table A 602, use time identifier or primary key value of Customer A to do an indexed lookup of Customer A into index AI 604, the Customer name index for intersect table I 606.
2) The index allows the finding of the appropriate rows in intersect table I 606. Indexes are B-trees superficially similar to the B-trees in the DPAs of the present invention, but are larger in scope rather than confined to related values for one set of record instances.
3) The lookup has identified a set of rows in the intersect table I 606 that have the Product key values 608 and 610 for this relationship in the second column of the indexed rows. The first column holds the Customer key values 612 and 614, corresponding to the various Product key values.
4) Use the Product key values 608 and 610 for an indexed lookup into index B 616, the Product key index for table B 618, the Product table.
5) The indexed lookup into index B 616 finds the related Product rows in the Product column P of the Product table, table B 618. From table B 618, it is observed that Customer A purchased a PC (Push Cart) 620 and a FL (Forklift) 622.
6) Use the Customer column C in the Product table, table B 618, to do an indexed lookup on index BI 628, the Customer index for the intersect table I 606.
7) The lookup finds the related rows in the intersect table I 606. This lookup indicates that four Product key values 608, 610, 630 and 632 have been involved with the purchase of either PC (Push Cart) 620 or FL (Forklift) 622.
8) Use the rows of the first column of intersect table I 606 that correspond to the Product key values of interest to do an index lookup into index A 638, the Customer identification index. The rows of interest in the first column of intersect table I 606 contain the Customer key values 612, 614, 634 and 636.
9) The lookup identifies the Customers that correspond to Customer key values 612, 614, 634 and 636. Thus, Customers C and D have purchased products purchased by customer A.

As evident from the above example, the traversal in the relational implementation involves more steps and takes up more time. Each individual lookup requires more time as well because the indexes are on the entire table, rather than just on the related data for each instance of the row/record as in the system of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A computer database management system for storing, retrieving and modifying complex data stored in a database, said system comprising:
   a number of application processes, each of said application processes including:
   a user accessible external application; and
   one of a multiplicity of application program interfaces for translating complex input data from said external application into a predefined intermediate data format and for translating said predefined intermediate data format into complex output data for said external application;
   a first schema coupled to said number of application processes, said first schema translating said predefined intermediate data format into one of a plurality of logical data model formats and for translating said plurality of logical data model formats into said intermediate data format;
   a second schema coupled to said first schema, said second schema defining a conceptual data model for translating said plurality of logical data model formats into a conceptual data format and for translating said conceptual data format into one of said logical data model formats; and
   a database server including storage means for storing and retrieving the complex data objects in and from the database, said server storing and retrieving the data objects according to said conceptual data format, said storage means including:

- a number of files, each of said files occupying a unique location within said storage means;
- a number of pages associated with each of said files, said pages being variable in number within each of said files, each of said variable number of pages occupying a unique location within each of said number of files and having an object portion for storing at least one of said database objects and a header portion for storing at least one offset number, each of said offset numbers occupying a unique location within said header and corresponding to one of said database objects stored on said page;
- a database key portion for storing a database key associated with each of said database objects, said database key including a page identification portion for identifying a unique one of said pages containing said database object and an object identification portion for identifying said unique location within said header portion of said unique page containing said offset number corresponding to said database object, wherein any of said database objects contained on said unique one of said pages within one of said number of files is stored at a location within said unique page determined by adding said offset number corresponding to said database object to the starting location of said unique page.

2. The system of claim 1 wherein the particular one of said number of files associated with said unique one of said pages containing said database object is inherent in said page identification portion of said database key of said database object.

3. The system of claim 2, wherein said page identification portion of said database key is a page number.

4. The system of claim 3, wherein said object identification portion of said database key is an object number.

5. The system of claim 4, wherein said database object includes a data record.

6. The system of claim 5, wherein said data record includes one of principal fragments and tributary fragment pointers.

7. The system of claim 6, wherein said data record includes the other of principal fragments and tributary fragment pointers.

8. The system of claim 3, wherein said data record further includes set pointers, said set pointers pointing to at least one of said plurality of database objects.

* * * * *